(12) United States Patent
Zajac et al.

(10) Patent No.: US 8,559,624 B1
(45) Date of Patent: Oct. 15, 2013

(54) CYPHOMETRY CONSISTING OF CIFERGLIFS, CHAOTIGLYPHS AND WORD AURAS

(76) Inventors: Edward J Zajac, Honolulu, HI (US); Robert Goris, Kanoehe, HI (US)

( * ) Notice: Subject to any disclaimer, the term of this patent is extended or adjusted under 35 U.S.C. 154(b) by 1632 days.

(21) Appl. No.: 11/618,547

(22) Filed: Dec. 29, 2006

(51) Int. Cl.
H04K 1/00 (2006.01)

(52) U.S. Cl.
USPC .............................. 380/28; 28/168; 345/420

(58) Field of Classification Search
USPC .............................. 380/28; 713/168; 345/420
See application file for complete search history.

(56) References Cited

U.S. PATENT DOCUMENTS

| | | | |
|---|---|---|---|
| 1,136,875 A | 4/1915 | Herbem | |
| 1,874,930 A | 8/1932 | Dorsch | |
| 1,978,107 A | 10/1934 | Hoffman | |
| 3,995,254 A | 11/1976 | Rosenbaum | |
| 4,610,025 A | 9/1986 | Blum | |
| 4,892,319 A | 1/1990 | Johnson | |
| 5,128,525 A | 7/1992 | Stearns | |
| 5,416,898 A | 5/1995 | Opstad | |
| 5,479,506 A | 12/1995 | Rehm | |
| 5,526,477 A | 6/1996 | McConnell | |
| 6,457,651 B2 | 10/2002 | Paul | |
| 6,575,756 B2 | 6/2003 | Sabin | |
| 6,871,789 B2 | 3/2005 | Hilton | |
| 2006/0126829 A1* | 6/2006 | Lai ................................. 380/28 |

FOREIGN PATENT DOCUMENTS

GB 474026 10/1937

* cited by examiner

Primary Examiner — Amare F Tabor
(74) Attorney, Agent, or Firm — Michael I. Kroll

(57) ABSTRACT

The invention discloses Cyphometry a cryptographic system comprising ciferglifs, chaotiglyphs and word auras. Cyphometry is an esoteric mathematical system that is the direct result of a comparative study of the complex geometric patterns that are formed through specific adding formulas within its fixed number scales between the digits zero (0) and nine (9) used to create ciferglifs, chaotiglyphs and word auras.

13 Claims, 41 Drawing Sheets

CYPHOMETRIC NUMBER SCALE THAT IS IN THE
3RD FORM (AD-A) CAN BE ADDED IN ANY OF THE
SIX FORMS

EXAMPLE
3RD       0   4   8   3   7   2   6   1   5   9
FORM
AD-A

| | | ADDING FORMULA FOR CNS AND WORD AURA SPINE | | | | | | | | |
|---|---|---|---|---|---|---|---|---|---|---|
| STANDARD | STD | 0 | 1 | 2 | 3 | 4 | 5 | 6 | ⑦ | 8 | 9 |
| MIRRORED | MRD | 0 | 2 | 4 | 6 | 8 | 1 | 3 | 5 | 7 | 9 |
| ADVERSE ACTIVE | AD-A | 0 | 4 | 8 | 3 | 7 | 2 | 6 | 1 | 5 | 9 |
| OPPOSITE | OPP | 0 | 8 | 7 | 6 | 5 | 4 | 3 | 2 | 1 | 9 |
| ADVERSE REACTIVE | (AD-R) | 0 | 7 | 5 | 3 | 1 | 8 | 6 | 4 | 2 | 9 |
| PAST PATHED | PSP | 0 | 5 | 1 | 6 | 2 | 7 | 3 | 8 | 4 | 9 |

"0" CAN ACT     0'S STAY        3'S CHANGE      6'S CHANGE      9'S STAY
AS A "9"        THE             EVERY           EVERY           THE
                SAME            OTHER           OTHER           SAME
                                CYCLE           CYCLE
                                                                "9" CAN ACT
                                                                AS A "0"

FIG. 7

ADDING FORMULA FOR CNS AND WORD AURA SPINE

| | | | | | | | | | | |
|---|---|---|---|---|---|---|---|---|---|---|
| STANDARD | STD | 0 | 1 | 2 | 3 | 4 | 5 | 6 | 7 | 8 | 9 |
| MIRRORED | MRD | 0 | 2 | 4 | 6 | 8 | 1 | 3 | 5 | 7 | 9 |
| ADVERSE ACTIVE | AD-A | 0 | 4 | 8 | 3 | 7 | 2 | 6 | 1 | 5 | 9 |
| OPPOSITE | OPP | 0 | 8 | 7 | 6 | 5 | 4 | 3 | 2 | 1 | 9 |
| ADVERSE REACTIVE | AD-R | 0 | 7 | 5 | 3 | 1 | 8 | 6 | 4 | 2 | 9 |
| PAST PATHED | PSP | 0 | 5 | 1 | 6 | 2 | 7 | 3 | 8 | 4 | 9 |

THE NUMBER WAVE LENGTHS FOR 4 AND 5 SEPARATED, AS SHOWN IN CODE BOX ABOVE

TH 4 & 5 CONNECTED POINT

CONNECTING THE 4 & 5 CONNECTED NUMERIC WAVE LENGTHS WITH EXACT COPIES AT THE END POINTS WILL FORM A SPHERE LIKE STRUCTURE

END POINT    CONNECT COPIES AT THESE END POINTS    END POINT

FIG. 10

NOTE:
1) THE HEAD AND ANTENNAS ARE MADE WITH THE NUMBERS 1, 8, AND 9

2) THE BODY AND ABDOMEN, FRONT AND BACK LEGS ARE MADE UP WITH THE NUMBERS 3, 6, AND 9

3) THE MIDDLE LEGS AND THE WINGS ARE MADE UP WITH THE NUMBERS 2, 7, AND 9

4) IN CYPHOMETRY THE 9 CAN ACT AS A ZERO AND CAN MIRROR ANY OTHER NUMBER.

Example #1
360° IN A CIRCLE

```
L   O   V   E
3   6   4   5  = 1 8 = 9

3 x 6 = 1 8 x 4 = 7 2 x 5 = 360°
```

Example #2
THE SUM OF 135 x 27
REVERT BACK TO THE CELL NUMBER OF THE WORD LOVE

```
L  O  V  E
3  6  4  5   = 1 8 = 9
```

CYPHOMETRIC NUMBER SCALE 8 9
+ 8
2 7
3 6
+ 4 5

```
1 3 5 x 2 7 = | 3 6 4 5 |
                L O V E
```

Example #3
BY USING UPPER CASE (CAPITAL LETTER) THE DEGREES OF THE ANGLES OF THE LETTERS MATCH THE CELL NUMBER OF THE WORD L = 90 degree angle
O = 360 degrees
V = 45 degree angle
E = 90 degree angles

LOVE
3645

D = 180 degrees (past tense)

FIG. 11D

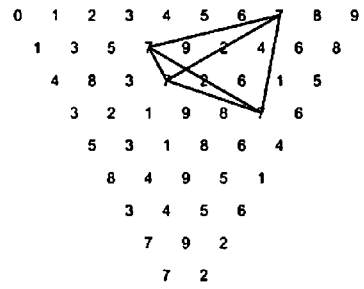
EXAMPLE #1
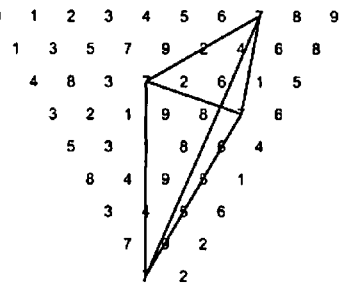
EXAMPLE #2
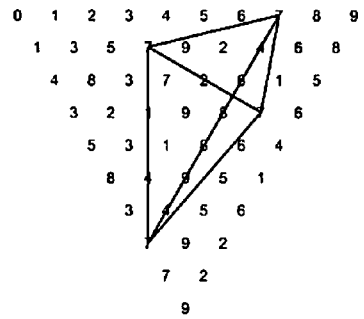
EXAMPLE #3
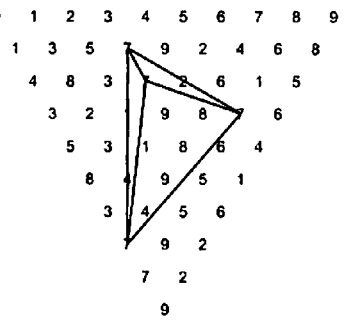
EXAMPLE #4
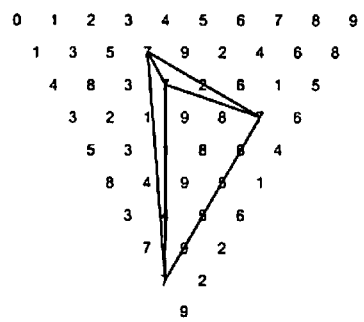
EXAMPLE #5
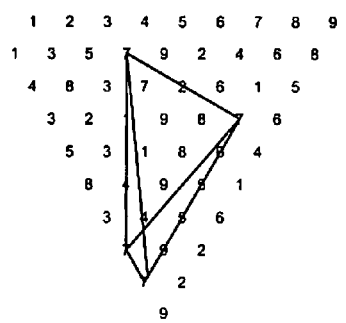
EXAMPLE #6
FIG. 17A

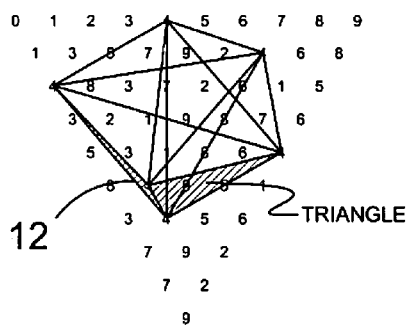
1ST FORM STANDARD NUMBER (4)
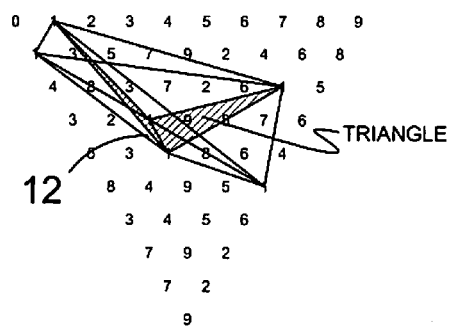
1ST FORM STANDARD NUMBER (1)
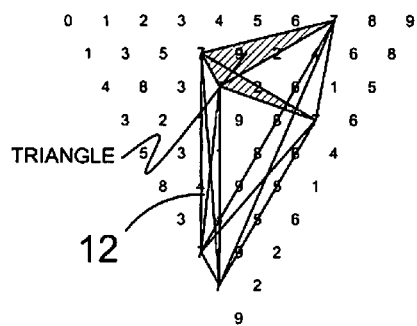
1ST FORM STANDARD NUMBER (7)
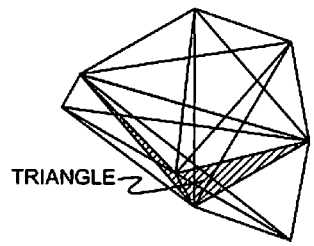
NUMBER (4) & (1) CONNECTED AND LINED UP
FIG. 18

* CREATING STEP ONE:           72

| WORD CODE FOR ENGLISH | | | | | | | | |
|---|---|---|---|---|---|---|---|---|
| A | B | C | D | E | F | G | H | I |
| J | K | L | M | N | O | P | Q | R |
| S | T | U | V | W | X | Y | Z | |
| 1 | 2 | 3 | 4 | 5 | 6 | 7 | 8 | 9 |

USING THE WORD "GOOD" AS AN EXAMPLE FOR A WORD (STANDARD FORM) AURA:

THE WORD "GOOD" "G" IS THE 7th LETTER OF THE ENGLISH ALPHABET, THEREFOR "G" IS 7. "O" IS THE 15th LETTER AND MUST BE REDUCED TO A SINGLE DIGIT 1+5=6, "D" IS THE FOURTH LETTER.

CELL NUMBER

THE CELL NUMBER FOR THE WORD "GOOD" IS 7664.

* CREATING STEP TWO:

CREATING THE SPINE:
BRING THE CELL NUMBER DOWN VERTICALLY

EXAMPLE:  7
         6  — CELL NUMBER
         6  ( THE WORD "GOOD" )
         4

THE OPPOSITE NUMBER OF THE CELL NUMBER
FOR "GOOD" IS 2335 AND IS PLACED ALONG
SIDE OF THE CELL NUMBER.

CELL NUMBER — 7|2
              6|3  — OPPOSITE NUMBER
   76         6|3
              4|5

EVERY NUMBER HAS AN OPPOSITE NUMBER.
THE OPPOSITE OF 0 IS 9 (9 STAYS THE SAME WITHIN THE SPINE)
THE OPPOSITE OF 1 IS 8
THE OPPOSITE OF 2 IS 7
THE OPPOSITE OF 3 IS 6
THE OPPOSITE OF 4 IS 5
THE OPPOSITE OF 5 IS 4      (ANY TWO SINGLE
THE OPPOSITE OF 6 IS 3      NUMBERS THAT ADD UP
THE OPPOSITE OF 7 IS 2      TO NINE ARE OPPOSITE
THE OPPOSITE OF 8 IS 1      EACH OTHER)
THE OPPOSITE OF 9 IS 0

FIG. 25

* CREATING STEP THREE:

THE FIRST PATTERN:
EXAMPLE 1:

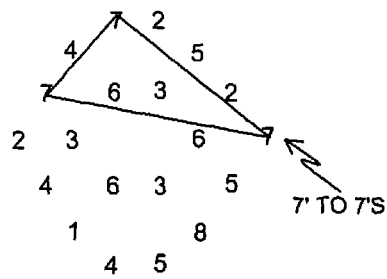

7' TO 7'S

TO SEE WHAT A 1/4 PATTERN WILL LOOK LIKE, DRAW LINES TO CONNECT ALL *LIKE NUMBERS
7'S WITH 7'S
2'S WITH 2'S
3'S WITH 3'S ETC.

* OTHER WAYS TO CONNECT:
ODD OR EVEN NUMBERS
OPPOSITE NUMBERS

THE FIRST PATTERN IS 1/4 OF THE WORD AURAS SPINES

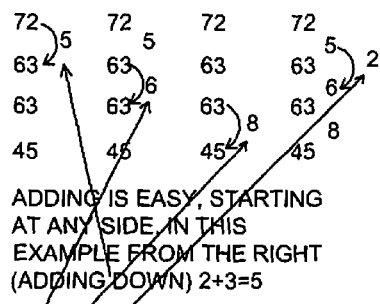

ADDING IS EASY, STARTING AT ANY SIDE. IN THIS EXAMPLE FROM THE RIGHT (ADDING DOWN) 2+3=5

3 +3 = 6

3 +5 = 8

5 +6 = 11 = 1 + 1 =2

AND SO ON, THEN ADD THE OTHER SIDE.

* ALWAYS BREAK NUMBERS DOWN TO SINGLE DIGITS.

EXAMPLE 2:

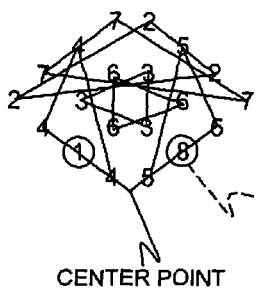

CENTER POINT

THE NUMBERS 1 AND 8 DO NOT HAVE LIKE NUMBERS TO CONNECT SO ARE DRAWN DOWN TO THE CENTER POINT.

FIG. 26

EXAMPLE 1:

BEGIN TO ADD THE CORNERS AS SUCH

THEY WILL FIT TOGETHER PERFECTLY

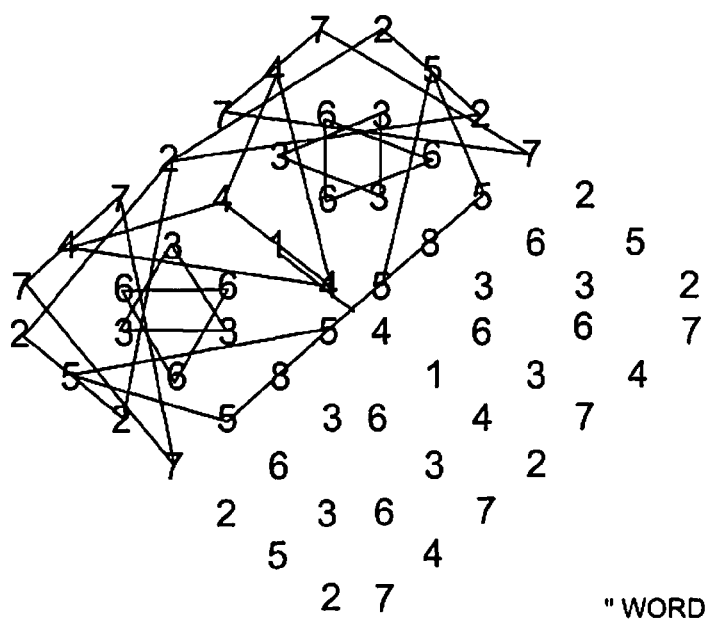
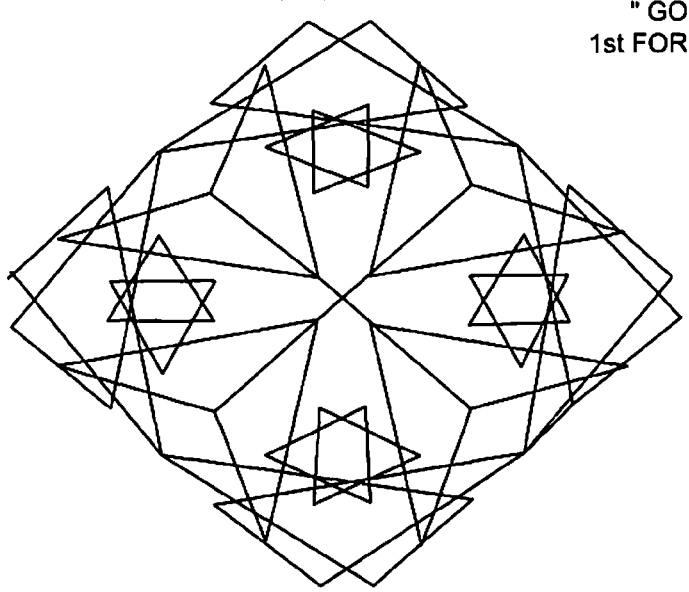
FIG. 30

EXAMPLE: A SENTENCE "HI HOW ARE YOU"
89 (HI)
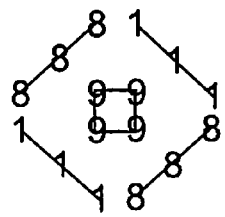
865 (HOW)
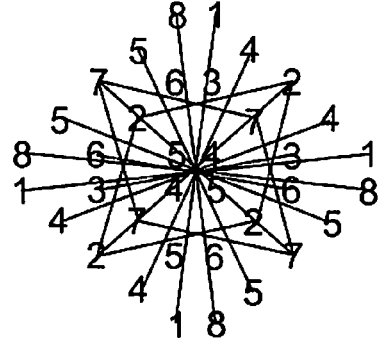
195 (ARE)
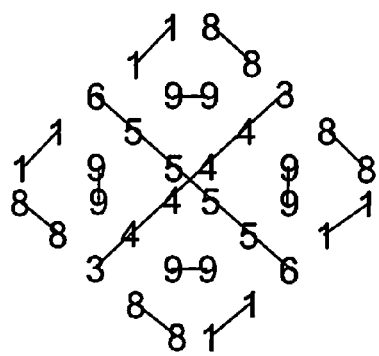
763 (YOU)
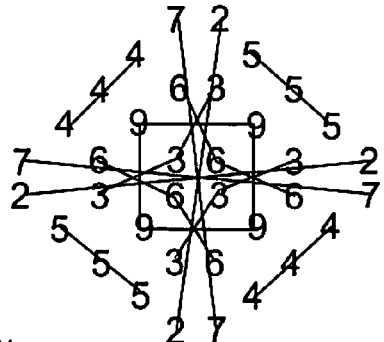
TOTAL
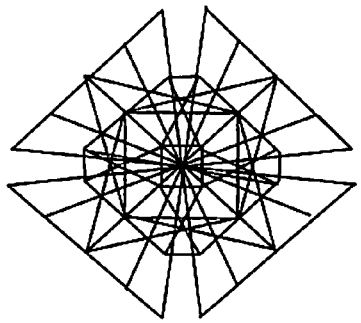
"HI HOW ARE YOU"
(IN STANDARD FORM)
FIG. 32

WORD CODE FOR ENGLISH

| A | B | C | D | E | F | G | H | I |
|---|---|---|---|---|---|---|---|---|
| J | K | L | M | N | O | P | Q | R |
| S | T | U | V | W | X | Y | Z |   |
| 1 | 2 | 3 | 4 | 5 | 6 | 7 | 8 | 9 |

72

70

ADDING FORMULA FOR CNS AND WORD AURA SPINE

| | | | | | | | | | | |
|---|---|---|---|---|---|---|---|---|---|---|
| STANDARD | STD | 0 | 1 | 2 | 3 | ④ | 5 | ⑥ | ⑦ | 8 | 9 |
| MIRRORED | MRD | 0 | 2 | 4 | 6 | 8 | 1 | 3 | 5 | 7 | 9 |
| ADVERSE ACTIVE | AD-A | 0 | 4 | 8 | 3 | ⑦ | 2 | ⑥ | ① | 5 | 9 |
| OPPOSITE | OPP | 0 | 8 | 7 | 6 | 5 | 4 | 3 | 2 | 1 | 9 |
| ADVERSE REACTIVE | AD-R | 0 | 7 | 5 | 3 | 1 | 8 | 6 | 4 | 2 | 9 |
| PAST PATHED | PSP | 0 | 5 | 1 | 6 | 2 | 7 | 3 | 8 | 4 | 9 |

GOD - (STD)
(764) - CELL#

JOY - (ADA)
(167) - CELL#

CENTER POINT

CENTER POINT

CYPHOMETRY CONSISTING OF CIFERGLIFS, CHAOTIGLYPHS AND WORD AURAS

BACKGROUND OF THE INVENTION

1. Field of the Invention

The present invention relates generally to cryptographic codes and puzzles and, more specifically, to cyphometry consisting of ciferglifs, chaotiglyphs and word auras.

2. Definition of Terms

Cyphometry is an esoteric mathematical system that is the direct result of a comparative study of the complex geometric patterns that are formed through specific adding formulas within its fixed number scales between the digits zero (0) and nine (9), hereinafter referred to as the cyphometric number scale.

Ciferglifs are created by using a fixed number scale ((cyphometric number scale), All ciferglifs are made up of smaller geometric structures, primarily offset tetrahedrons and triangles. All ciferglifs fit together like a puzzle in form or fashion. Ciferglifs in this way illustrate geometrically the concept of connectivity much like letter within the English alphabet. Example: the letters "L" and "F" can be found within the letter "E".

Cyphometry is an esoteric mathematical system that is the direct result of a comparative study of the complex geometric patterns that are formed through specific adding formulas within its fixed number scales. Cyphometry presents a unique theoretical and mystical insight as to how the secrets and relationships between the digits zero (0) and nine (9) in correlation with the other numbers relate to nature and to the human psyche.

Cyphometry also contains a built-in secret writing/mutative code system that is based on a set key and/or predetermined rules that apply an abstract methodology to the three basic forms of written/oral communication; numbers, letters, and symbolism.

The cyphometric number scale (CNS) and space adding are used to create ciferglifs. Space adding utilizes the sum of the adjacent numbers and the resulting sum is placed centrally below. Space adding is repeated continuously until a single digit is present. Once all the space adding is complete, a cyphometric triangle is formed. Cyphometric numbering will always be a single digit. When the sum of two numbers is equal or greater than 10, the numbers of the sum are then added together to create a new single digit sum.

| Examples Single Digit Adding | Examples Extreme Opposites of 0/9: |
|---|---|
| 5 + 6 = 11 then 1 + 1 = 2 | 0 + 2 = 2 |
| 6 + 7 = 13 then 1 + 3 = 4 | 9 + 2 = 11 then 1 + 1 = 2 |
| 7 + 8 = 15 then 1 + 5 = 6 | 0 × 2 = 0 |
| 8 + 9 = 17 then 1 + 7 = 8 | 9 × 2 = 18 then 1 + 8 = 9 |

When a cyphometric triangle is formed using the cyphometric number scale, the second run of numbers below the CNS represent odd numbers on the left side and even numbers are represented on the right side. In cyphometry, zero (0) and nine (9) are opposites to their extremes. Zero (0) represents nothing or un-created energy, and nine (9) represents everything or all created energy/future (the highest number of any sequence). As light and dark have the same effect at their extremes (not able to see), zero (0) and nine (9) have the same effect, except numerically. In turn, nine (9) can act as a zero (0) and zero (0) can act as a nine (9) in defining cyphometry.

The cyphometric number scale may be oriented in many ways. Such forms include horizontal, vertical, and or angled. When space adding is applied to the cyphometric number scale in any length boundary, cyphometric triangle(s) will manifest itself. As a result cyphometric triangles may intersect one another, as with chaosometric triangles.

There are six adding formulas that are used to create a cyphometric number scale and a word aura spine. The six forms are; standard, mirrored, adverse active, opposite, adverse reactive, and past pathed. Each adding formula is unique, but all forms consist of the ten single digits (0-9) that are used only once in any cyphometric number scale.

| Adding Formula for (CNS) and Word Aura Spine | | | | | | | | | | |
|---|---|---|---|---|---|---|---|---|---|---|
| Standard | STD | 0 | 1 | 2 | 3 | 4 | 5 | 6 | 7 | 8 | 9 |
| Mirrored | MRD | 0 | 2 | 4 | 6 | 8 | 1 | 3 | 5 | 7 | 9 |
| Adverse Active | AD-A | 0 | 4 | 8 | 3 | 7 | 2 | 6 | 1 | 5 | 9 |
| Opposite | OPP | 0 | 8 | 7 | 6 | 5 | 4 | 3 | 2 | 1 | 9 |
| Adverse Reactive | AD-R | 0 | 7 | 5 | 3 | 1 | 8 | 6 | 4 | 2 | 9 |
| Past Pathed | PSP | 0 | 5 | 1 | 6 | 2 | 7 | 3 | 8 | 4 | 9 |

When working with either, the math is the same, any two numbers that are added together are, if necessary, reduced to a single digit. That sum is described in standard 1st form which is also the cyphometric number scale (0 thru 9). To identify the value of a number in another form, the intersection of the column and row is used. Example: 4+3=7. To find the adverse-reactive equivalent to 4+3, go to the column of the 1st form sum (7), move down the column until the adverse-reactive (5th form) row is reached at the left. The resulting adverse-reactive value of 4+3 is equal to 4. Each code form is a cyphometric number scale because they begin with 0/9 and/or end with 0/9. The numbers between are opposites at both ends of the scale at any given point.

The six adding formulas that are used to create a cyphometric number scale and a word aura spine is also used create numeric wave lengths. Numeric wave lengths are created by connecting like numbers. Like ciferglifs, the formed numeric wave lengths are opposites.

The code forms for word auras and ciferglifs are within the cyphometric triangle. By spaced adding the numbers of each row in the same single digit format, each of the first six rows depict a single repetitive digit that is in turn used to identify the code form. Note: the repeat digit is represented in each of the code forms in the same position within the cyphometric triangle.

All ciferglifs as well as chaotiglyphs are made up of smaller geometric structures, primarily offset tetrahedrons and triangles. Each cyphometric triangle and chaosometric triangles will vary depending on the adding formula it's in. Additionally, there are three methods of lining numbers within a cyphometric triangle. These methods include; based lining, scaled lining and selected lining.

In based lining, of the six equivalent digits, a line is drawn from each of the five digits to the same digit within the cyphometric number scale.

In scaled lining, of the six equivalent digits, a line is drawn from each to a like number resulting in five lines starting from a given digit.

In selected lining, of the six equivalent digits, the user selects a quantity less than six to interconnect (if 4 of the 6 were selected, each of the four digits would have three lines starting from a given digit.)

All ciferglifs fit together like a puzzle in form or fashion. Ciferglifs in this way illustrate geometrically the concept of connectivity much like letter within the English alphabet. Example: the letters "L" and "F" can be found within the letter "E".

We have established that ciferglifs are created by using a fixed number scale ((cyphometric number scale), chaotiglyphs on the other hand, utilize a chaosometric number scale. A chaosometric number scale does not utilize the number (0) and must end with the number it began the sequence with. The same side adding principals apply in creating the chaosometric triangle. Depending on the form of a chaosometric triangle is in, chaotiglyphs can create ciferglifs by using different numbers and are generally angled and can even be upside down.

The present invention, word auras are an abstract esoteric art form that utilize the three basic forms of written communication, numbers, letters and symbols. Any word in any written language can be given a numerical value and that number value can be translated into a geometric design or symbol. Taking a word and translating it into a number then transforming that number into a symbol. It is a kind of systematic fusion between mysticism and science, the impractical with the practical. Also word auras are a code system that can mutate like a virus, without changing its structure.

Word auras: are the only esoteric art in the world that combines the three basic forms of written communication, numbers, letters and symbols to form complex geometric designs derived from the numerical values given to the letters of words. The word code depicted below is the preferred arrangement of letters of the alphabet; other arrangements may be defined to create different codes and would result in different shaped word auras.

| Word Code for English | | | | | | | | |
|---|---|---|---|---|---|---|---|---|
| A | B | C | D | E | F | G | H | I |
| J | K | L | M | N | O | P | Q | R |
| S | T | U | V | W | X | Y | Z |   |
| 1 | 2 | 3 | 4 | 5 | 6 | 7 | 8 | 9 |

Using the word "good" as an example for a word (standard form) aura: the word "good" "g" is the 7th letter of the English alphabet, therefore "G" is 7. "O" is the 15th letter and must be reduced to a single digit 1+5=6, "D" is the fourth letter. Hence, GOOD is equal to 7664.

Disks are points that can be shared by any number and it's opposite and is centrally located between said numbers. In creating a numeric structure, a line may be drawn to the disk in lieu of the number.

Code forms relationships are derived between cyphometric number scale and both the far right and far left of the cyphometric triangle. In such, a quantitative value of itself spaced added will result in the last number of the far left or right row of the cyphometric triangle.

Binding opposites are used to create platonic solids. All ciferglifs can connect to each other in some fashion and lines can be added to the numbers that are not connected as long as they are opposites (1 & 8) (2 & 7) (3 & 6) or (4 & 5). This connection is called binding. In turn, binding of opposites are utilized to create platonic solids such as a cube, tetrahedron, or octahedron.

Cyphometry is a non-conventional geometry, however, one can create many practical applications such as periodic tiling in an abstract way. A cyphometric number scale ordered in the same fashion as with cell numbers in word auras will create periodic tiling. Using ¼ of the full structure and select lining by using only the structures made by 3 and 6, one can create a simple form of periodic tiling.

Description of the Prior Art

There are other cryptographic codes and puzzles. Typical of these is U.S. Pat. No. 1,136,875 issued to Herbern on Apr. 20, 1915.

Another patent was issued to Hoffman on Oct. 23, 1934 as U.S. Pat. No. 1,978,107. Yet another U.S. Pat. No. 3,995,254 was issued to Rosenbaum on Nov. 30, 1076 and still yet another was issued on Sep. 2, 1986 to Blum as U.S. Pat. No. 4,610,025.

Another patent was issued to Johnson on Jan. 9, 1990 as U.S. Pat. No. 4,892,319. Yet another U.S. Pat. No. 5,128,525 was issued to Stearns on Jul. 7, 1992. Another was issued to Opstad on May 16, 1995 as U.S. Pat. No. 5,416,898 and still yet another was issued on Dec. 26, 1995 to Rehm as U.S. Pat. No. 5,479,506.

Another U.S. patent was issued to McConnell et al. on Jun. 11, 1996 as U.S. Pat. No. 5,526,477. Yet U.S. Pat. No. 6,457,651 was issued to Paul on Oct. 1, 2002. Another was filed by Sabin on Jun. 10, 2003 as U.S. Pat. No. 6,575,756. Still yet another was filed by Hilton on Mar. 29, 2005 as U.S. Pat. No. 6,871,789. Internationally, a U.K. Patent was issued to Jaggard on Oct. 20, 1937 as GB474,026

U.S. Pat. No. 1,136,875

Inventor: Herbern

Issued: Apr. 20, 1915

Invention provided new and useful Improvements in Cryptographic Code Cards, of which the following is a specification. The object of the present invention is to provide: a compact and readily changeable cryptographic code device.

U.S. Pat. No. 1,874,930

Inventor: Dorsch

Issued: Aug. 30, 1932

This invention relates to improvements in games. It is one of the objects of this invention to provide an improved game which is adapted for the entertainment of, both young and old, and which may be played in a number of different manners by two or more persons. A more specific object of this invention is to provide a game utilizing a belt bearing a plurality of characters, the said belt being movable within a casing having a plurality of, normally closed windows, and said characters on the belt being adapted to register with said windows so that if a predetermined character is stopped at a selected window the person who has selected said window will gain an advantage in the game.

U.S. Pat. No. 1,978,107

Inventor: Hoffmann

Issued: Oct. 23, 1934

This invention relates to games or puzzles of the matched pattern type. One; object of the invention is to provide in a game or puzzle of this—kind a board or ground upon which is delineated a base pattern, 'scheme' or puzzle lay-out to be matched or reconstructed, and a plurality of "men" or, play pieces for correctly laying; over the base pattern, each "man" or piece bearing digits, figures, letters, characters, indicia or markings corresponding or answering to or indicating that portion of the base pattern immediately underlying the said "man" or play piece as correctly placed, whereby through' the correct placing of the play pieces upon the underlying pattern, side' by side, end to end or end to side, the said base pattern or puzzle lay-out will be reproduced or represented or, reconstructed upon the combined upper; surfaces of the said "men" or play pieces.

U.S. Pat. No. 3,995,254

Inventor: Rosenbaum

Issued: Nov. 30, 1976

A digital reference matrix apparatus is disclosed for verifying input alpha words from a keyboard, character recognition machine, or voice analyzer as valid linguistic expressions. The organization of the digital reference matrix is based upon the character transfer function of the input apparatus. The digital reference matrix contains a vector representation for each dictionary word in the form of a calculated vector magnitude and unique vector angle. The set of magnitudes and angles is stored in the digital reference matrix using a form of run length coding by storing a single magnitude pointer followed by the chain of unique angles for words having the same magnitude. The vector magnitude so calculated constitutes the address data for accessing the digital reference matrix. When an input word is received for verification, the word's magnitude and angle attributes are calculated and the digital reference matrix is accessed at the magnitude of the input word and the corresponding angles are searched for a match. An output signal is generated indicating whether or not the input word is valid. The organization of the digital reference matrix minimizes the size of the array needed for accurate word verification representation through the use of the combination of digital angle representation and run length compaction of the magnitude/angle verification syntax.

U.S. Pat. No. 4,610,025

Inventor: Blum

Issued: Sep. 2, 1986

A system for recognizing the content of a communication in symbolic language and composed of plural glyphs arranged in a predetermined order, each glyph being the smallest (lowest) informational unit of the language. The system includes a device for inputting a stream of data indicative of the plural glyphs, such as formed in a page of text. That stream is input into a storage means. The stored data is horizontally segmented into discrete lines of text and is then vertically segmented into individual glyphs. Each individual glyph is assigned a unique identifier, whereby all substantially identical glyphs are represented by the same identifier. The identifiers are arranged in a sequence corresponding to the sequence in which the glyphs appeared in the communication, thus representing glyph "words". The system then applies decryption routines which include general cryptographic techniques to the identifiers, their sequences and their interrelationships to determine the equivalent symbol of language corresponding to each identifier. Once the symbol of language corresponding to each identifier has been determined, the machine code equivalent (i.e., code capable of being "understood" and utilized by an electronic computer) is substituted for each identifier, so as to provide a machine readable code representation of the communication, e.g., page of text.

U.S. Pat. No. 4,892,319

Inventor: Johnson

Issued: Jan. 9, 1990

An apparatus for a word game is disclosed. A game board surface is divided into a number of squares into which playing pieces containing the letters of the alphabet are placed to complete a word. The various words are contained in groups which, when of a certain size, are considered to be an ISLAND which creates the right to start a new word independent from all the other which is an ATOLL. Except for ATOLLS and the beginning of the game, any new letters added must form a word with those letters already on the playing field. New words which link one ISLAND to another ISLAND or ATOLL are ISTHMUSES and capture the ISLAND or ATOLL to which they are linked as part of the territory for the player creating such an ISTHMUS. Two iscosahedron dice having their faces numbered from 1 to 20 are used to randomly select numbers from 2 to 40. These numbers are related to the letters of the alphabet by a decoder with the frequency of number approximating the frequency of the use of the letters in making words. The seldom used letters of the alphabet are increased through the use of a number of bonus letters and the value of the individual letters vary based on a scoring code. The individual ownership of ATOLLS, ISTHMUSES and ISLANDS is shown by a color-coded transparent flag placed on top of one of the previously played letters.

U.S. Pat. No. 5,128,525

Inventor: Stearns

Issued: Jul. 7, 1992

Weighted and unweighted convolution filtering processes are provided for decoding bitmap image space representations of self-clocking glyph shape codes and for tracking the number and locations of the ambiguities or "errors" that are encountered during the decoding. This error detection may be linked to or compared against the error statistics from an alternative decoding process, such as the binary image processing techniques that are described herein to increase the reliability of the decoding that is obtained.

U.S. Pat. No. 5,416,898

Inventor: Opstad

Issued: May 16, 1995

A computer system for rendering text is provided. A keyboard is used to enter characters into the computer system. A character code corresponding to each entered character is generated. A particular font is chosen from a font table stored in memory. The font table contains a number of different fonts, with each font having a number of glyph indexes corresponding to a number of different glyphs. A character can have a plurality of different glyph indexes for a particular font. A processor maps the character code to a glyph index according to the selected font and later processes the glyph index. The glyph corresponding to the processed glyph index is then displayed.

U.S. Pat. No. 5,479,506

Inventor: Rehm

Issued: Dec. 26, 1995

A game apparatus including a puzzle and a conforming device. The puzzle includes ciphertext indicia and a number of designated spaces corresponding with the ciphertext for displaying a developing solution. The ciphertext is a message encrypted according to some substitutional and/or transpositional encipherment scheme. At each stage of solving, the ciphertext and developing solution show what has been correctly solved and what remains to be solved. The conforming device verifies the correctness of correct guesses and corrects incorrect guesses without prejudicing future guesses. There are manifold types of messages, encipherment schemes, developing solutions and conforming devices. Some puzzles and conforming devices are made by a computerized method. The game can be played by one player or several players in competition. It can be played using a game board or other apparatus or by using a computer with an interactive computer program. To solve a puzzle, a puzzle solver first forms a guess-pair. Typically, a guess-pair is a plain character and a cipher character that could be the plain character's substitute. The conforming device is used to verify the correctness of the guess-pair, or if it is wrong, to obtain a correction. The verified or corrected guess-pair is then used to update the developing solution. These three steps are repeated at least once. There are various scoring rules for various versions of the game.

U.S. Pat. No. 5,526,477

Inventor: McConnell

Issued: Jan. 11, 1996

A method and apparatus for generating glyphs for text elements input to a computer having a memory with at least one look-up table storing glyphs corresponding to such text elements. Each text element is made up of at least one code point, and often of several code points. The system searches the table for a glyph representing an input text element, and if it is not found methodically generates subsets of the text element and searches the table for glyphs representing each of the subsets. Default characters are generated for code points not represented in the table. The system uses a classification for each code point, such as the Unicode classifications, and handles unknown code points in a manner dependent upon their classification. Where a text element includes two characters with an intermediate joining character, and the text element as a whole is not represented in the table, the two characters are output for rendering separately. Where a text element includes combining characters and the combined text element as whole is not represented in the table, the system generates the characters separately and then combines them for rendering as a single glyph. Unknown combining characters are replaced by a code point for a blank combining character, for allowing any surrounding combining characters to be rendered in a combined fashion.

U.S. Pat. No. 6,457,651

Inventor: Paul

Issued: Oct. 1, 2002

A dual level encryption method, and document, for providing and obtaining a substantially increased amount of optically readable information from an otherwise conventional and highly visible printed bar code pattern area on a document without interfering with the conventional optical reading of the conventional information in the bar code, comprising integrally printing a second and very much finer pattern of encoded optically machine readable glyph code or other such indicia within the bar code pattern area, containing a much higher level of information, to provide two different levels of information within the same area. Scanning the bar code pattern with a conventional bar code reader extracts conventional bar coded information embedded in the bar code without interference from the second indicia. Scanning the same bar code pattern area with a different, higher resolution, optical scanner extracts the much greater amount of information from the second, much finer, optically readable indicia pattern.

U.S. Pat. No. 6,575,756

Inventor: Sabin

Issued: Jun. 10, 2003

A set of blocks used as an aid for teaching mathematical concepts, in which blocks of different sizes are provided with characteristic dimensions that bear a relationship to preselected numbers in the Fibonacci series. The Fibonacci series is defined as an infinite sequence of numbers starting with 1 that builds by adding the present number to the prior number to form the next number in the series. The first part of the series progresses: 1, 1, 2, 3, 5, 8. 13, 21, 34, 55, . . . , with 0 being understood as the number prior to 1. The series is related to the Golden Ratio of approximately 1:1.618, a ratio found in nature and in certain works of art, by the ratio of adjacent numbers, after thirteen, in the series. The blocks can be used to teach students mathematical concepts such as pattern recognition, the Fibonacci series and related Golden Ratio, and the interrelations between mathematics and other disciplines such as biology, botany, and architecture.

U.S. Pat. No. 6,871,789

Inventor: Hilton

Issued: Mar. 29, 2005

A document is printed with graphical symbols which encode information but are not human readable; the graphical symbols are formed into some or all of visible element printed on the document. The outline of this element is used for synchronising an automated process for scanning the document to extract the encoded information from the element. In prior art systems, synchronising an automated process for scanning the document to extract the encoded information from the element requires large scale arrangement of the graphical symbols (e.g. a horizontal line of glyphs which are all forward facing and which intersect a vertical line of glyphs which are all rearward facing). This considerably mars the appearance of a printed document. This negative impact on appearance has been one of the major causes inhibiting the uptake of graphical symbol technology for encoding information.

United Kingdom Patent Number GB474026

Inventor: Jaggard

Published: Oct. 20, 1937

Puzzles are formed by selecting pieces from a set of ninety-six four-sided pieces of the same shape and size, the edges of the pieces being marked in order with the following sets of four numerals or corresponding numerals or corresponding other distinguishing marks, 1234, 1238, 1247, 1278, 1346, 1368, 1467, 1678, 5234, 5238, 5247, 5278, 5346, 5368, 5467, 5678, each set being arranged in all possible orders to give ninety-six differently marked pieces. The pieces may be square, diamond or oblong shape. The numerals may be replaced by corresponding numerals, light and dark colours, or combinations thereof, objects, pips (as on dominoes), letters, or upright and inverted words.

While these cryptographic codes and puzzles may be suitable for the purposes for which they were designed, they would not be as suitable for the purposes of the present invention, as hereinafter described.

SUMMARY OF THE PRESENT INVENTION

A primary object of the present invention is to provide cyphometry consisting of ciferglifs, chaotiglyphs and word auras/glyph art.

Another object of the present invention is to provide an esoteric system of secret writing based on a set key, or predetermined rules and/or codes and geometry.

Yet another object of the present invention is to provide an esoteric system of secret writing based on the cyphometric number scale.

Still yet another object of the present invention is to provide an esoteric system of secret writing based on the cyphometric number scale and space adding used to create ciferglifs.

Another object of the present invention is to provide a cyphometric number scale that may be oriented in many ways as long as the scale begins with (0/9) and ends in (0/9). Such forms include horizontal, vertical, and or angled.

Yet another object of the present invention is to provide an esoteric system of secret writing utilizing methods of lining numbers used to create ciferglifs.

Still yet another object of the present invention is to provide an esoteric system of secret writing utilizing a based lining method used to create ciferglifs.

Still yet another object of the present invention is to provide an esoteric system of secret writing utilizing a scaled lining method used to create ciferglifs.

Another object of the present invention is to provide an esoteric system of secret writing utilizing a scaled selected method used to create ciferglifs.

Yet another object of the present invention is to provide an esoteric system of secret writing based on the cyphometric number scale number scale and space adding used to create chaotiglyphs.

Additional objects of the present invention will appear as the description proceeds.

The present invention overcomes the shortcomings of the prior art by providing an esoteric system of secret writing based on a set key, or predetermined rules and/or codes and geometry based on cyphometry consisting of ciferglifs, chaotiglyphs and word auras.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which:

FIG. 7 is a chart for the adding formula for the cyphometric number scale and word aura spine.

FIG. 10 is an illustration depicting a chart for the adding formula used to create numeric wave lengths.

Figure 11A:
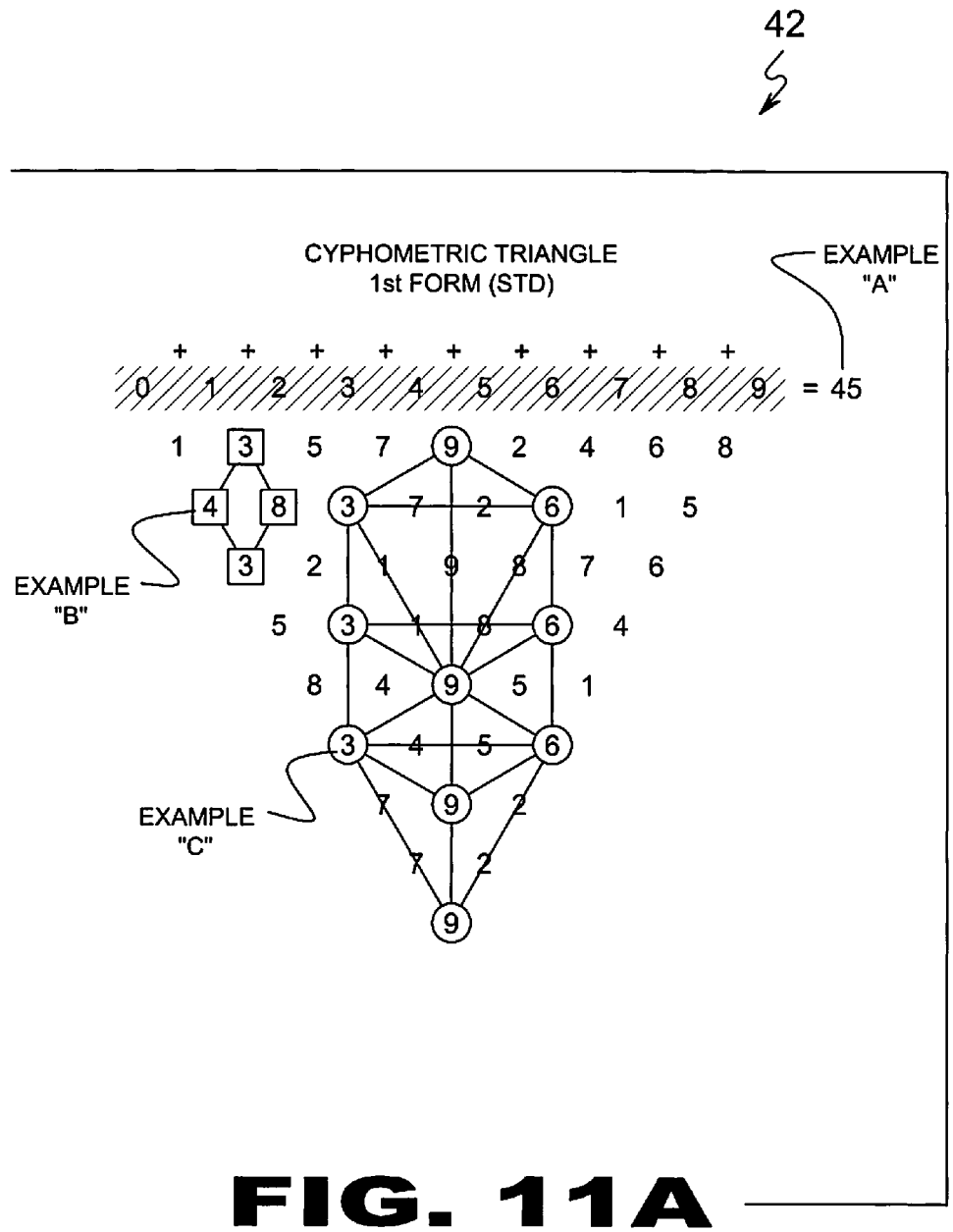
Figure 11B:
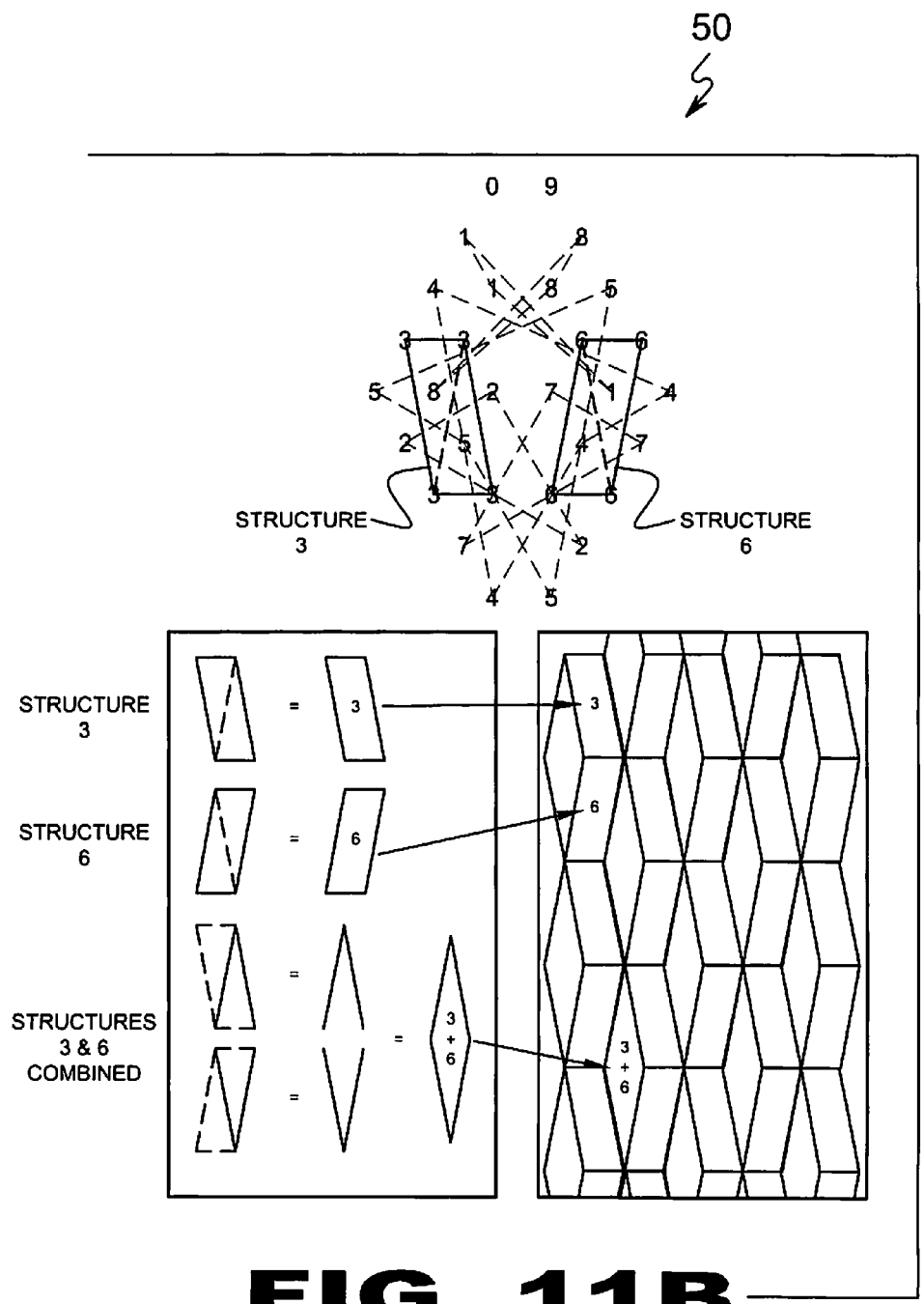
Figure 11C:
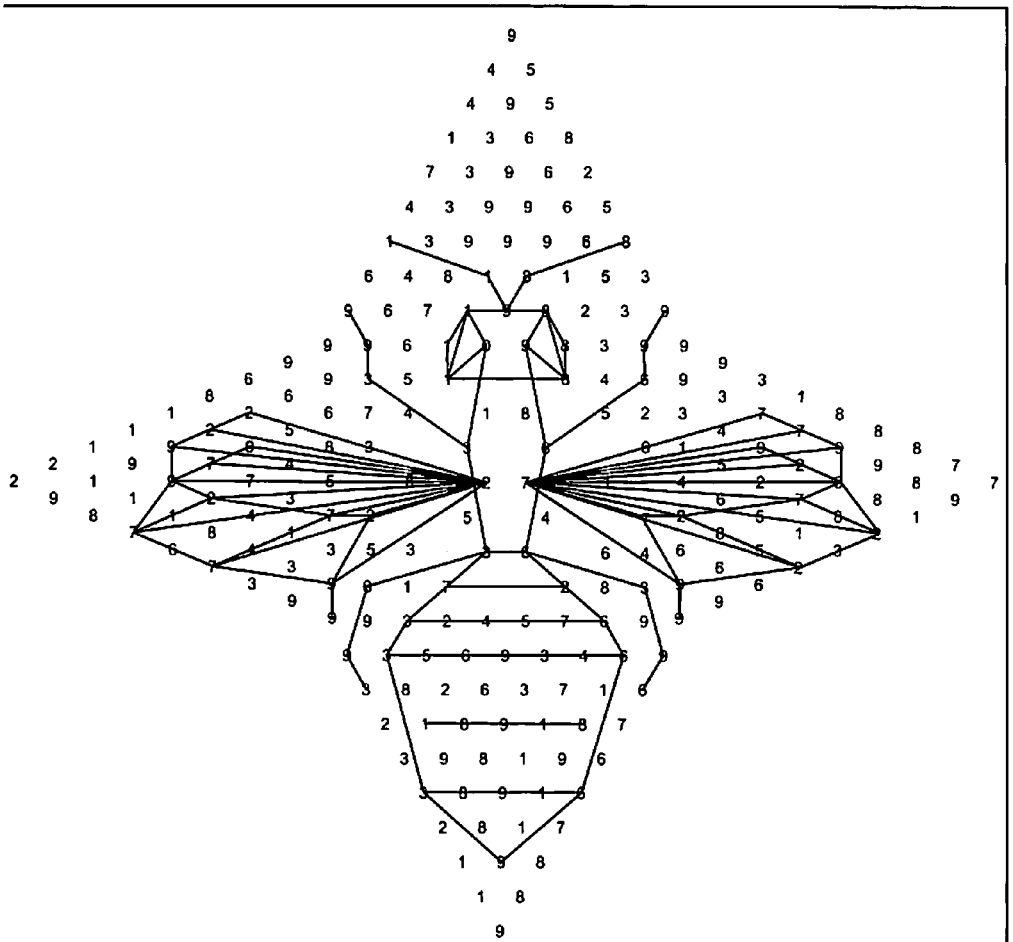
Figure 12:
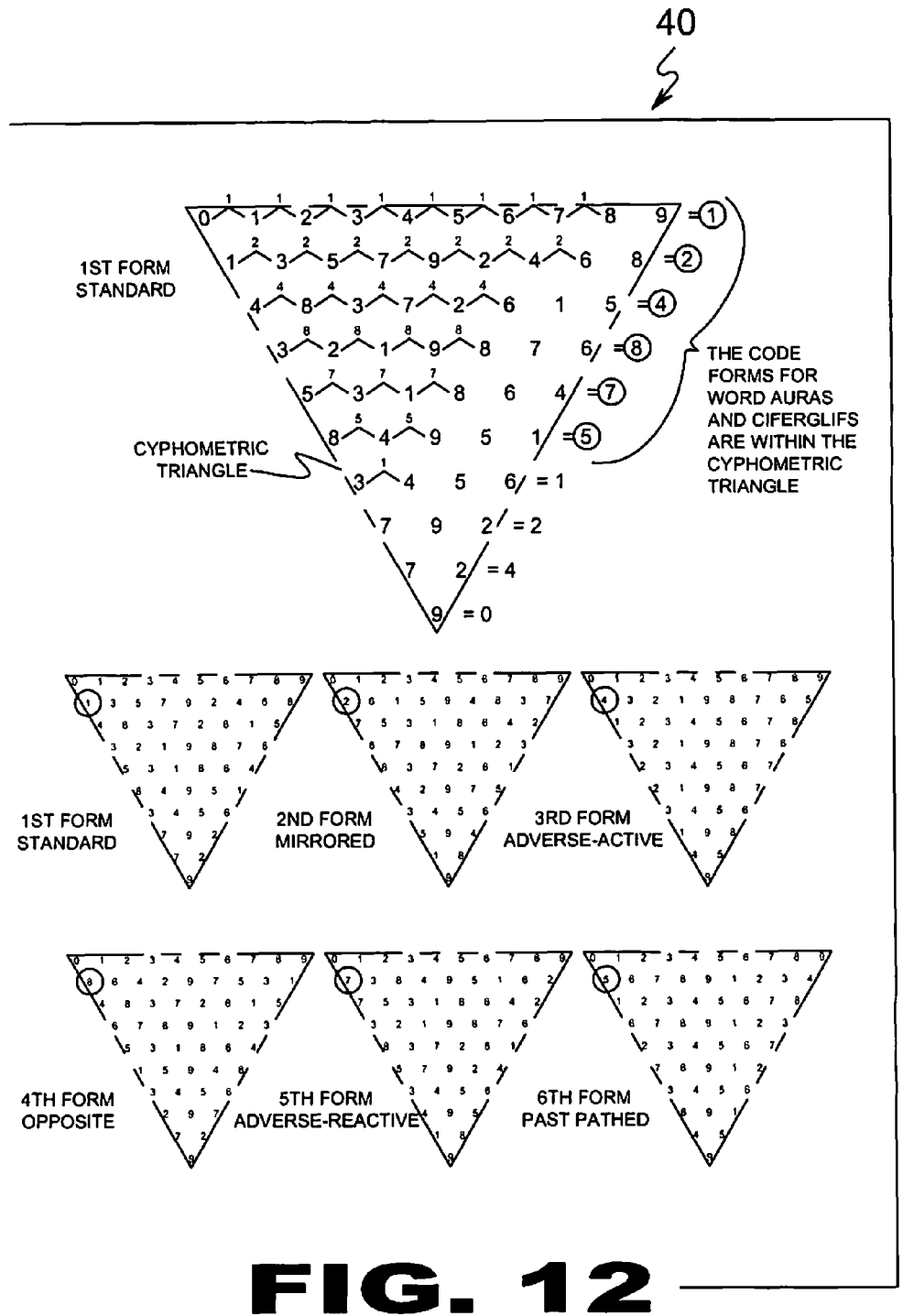

FIG. 11A is an illustrative view describing the derived code forms relationship within the cyphometric number scale and the cyphometric triangle FIG. 11b is an illustrative view describing a common form of periodic tiling FIG. 11c is an illustrative view of an insect composed of lined opposite numbers with straight lines FIG. 11d is an illustrative view describing cyphometry as a mathematical system that expresses a numeric theology FIG. 12 is an illustrative view describing the derived code forms.

Figure 13:
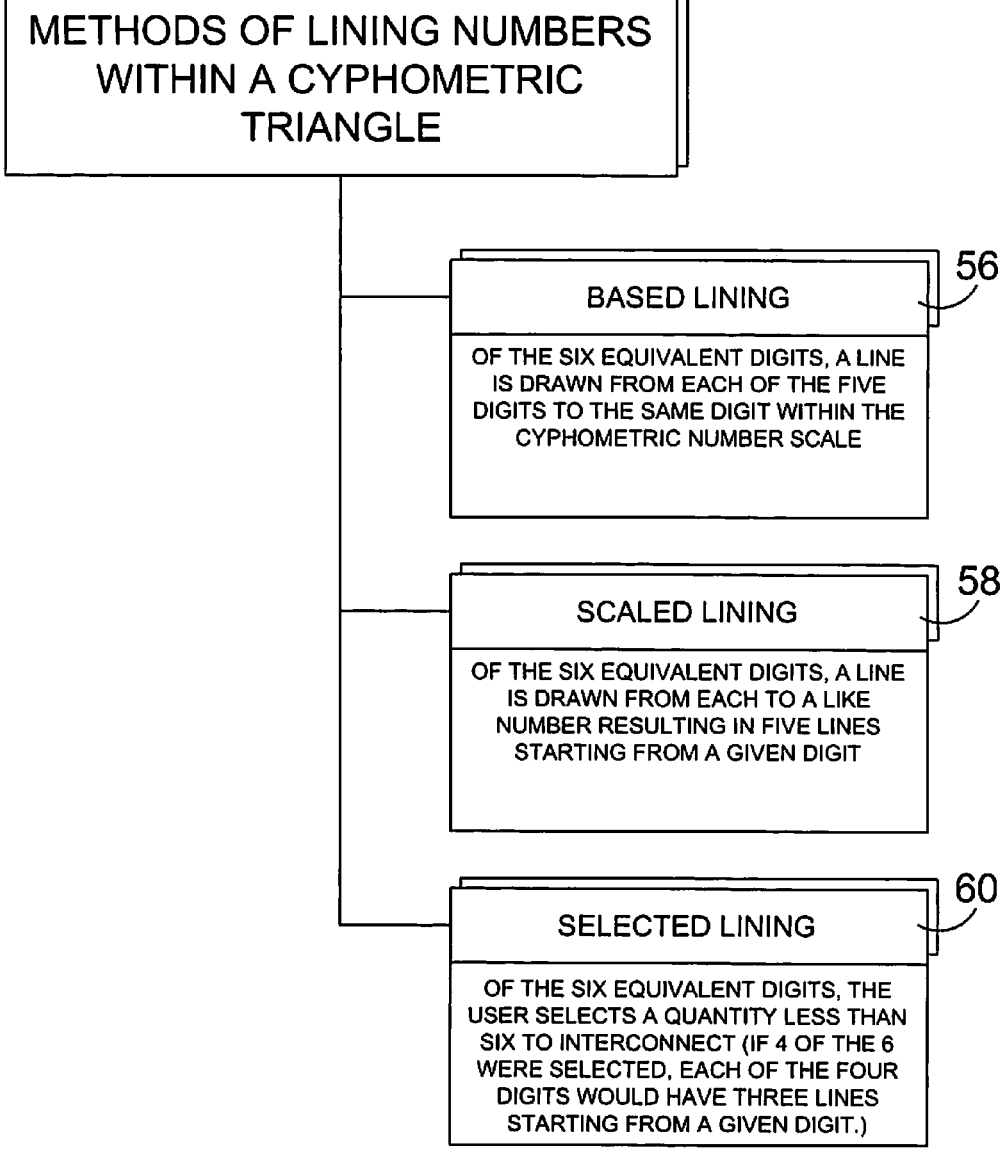

FIG. 13 is a block diagram of the basic methods of lining within a cyphometric triangle.

Figure 14:
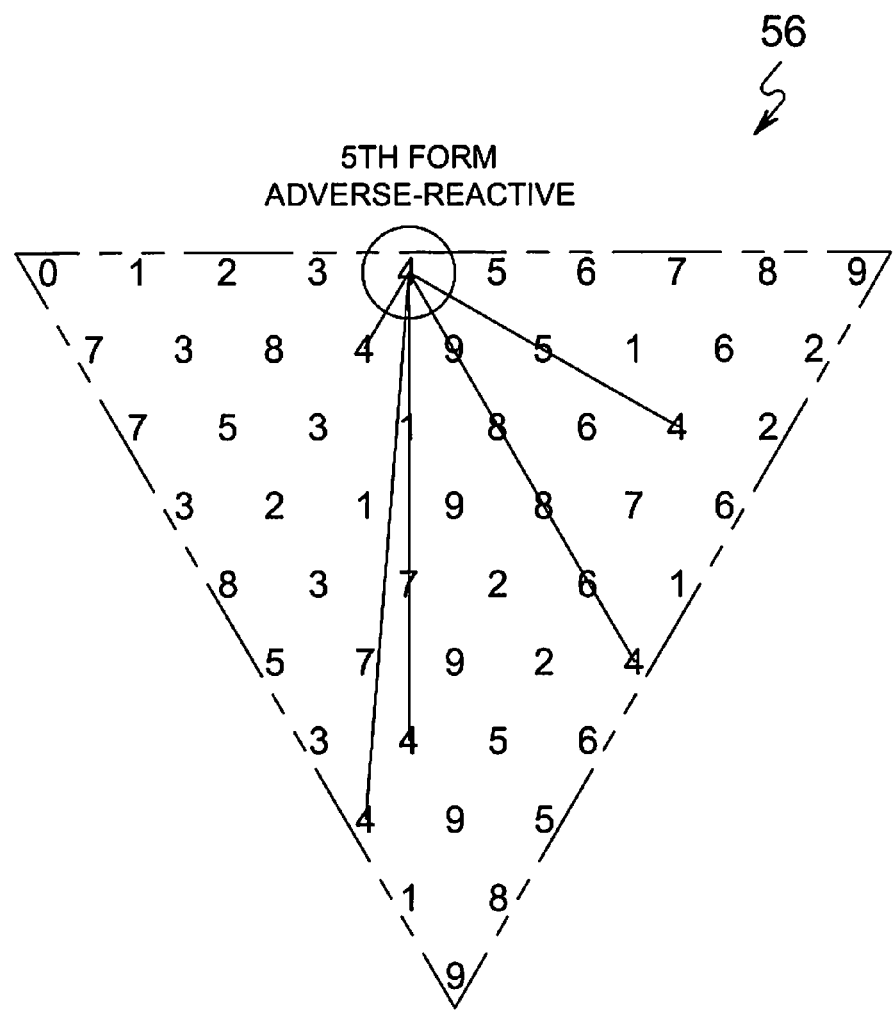

FIG. 14 is an illustrative view of the method of based lining within a cyphometric triangle.

Figure 15:
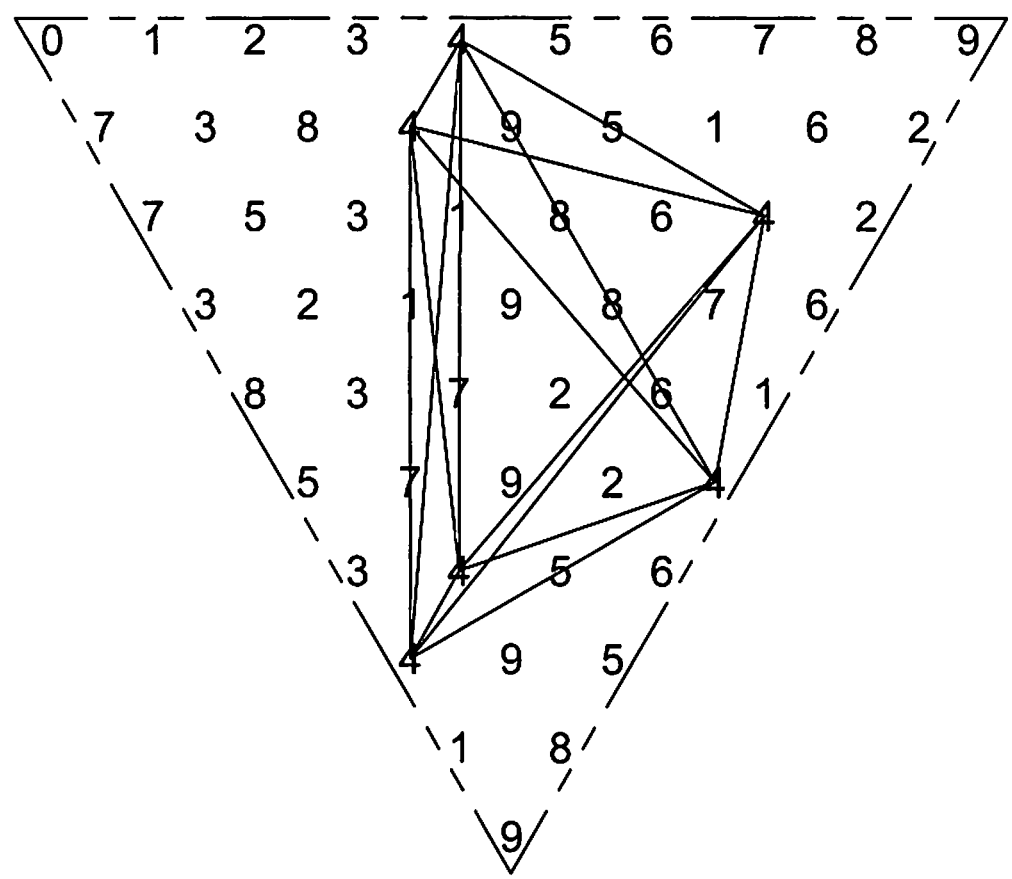

FIG. 15 is an illustrative view of the method of scaled lining within a cyphometric triangle.

Figure 16:
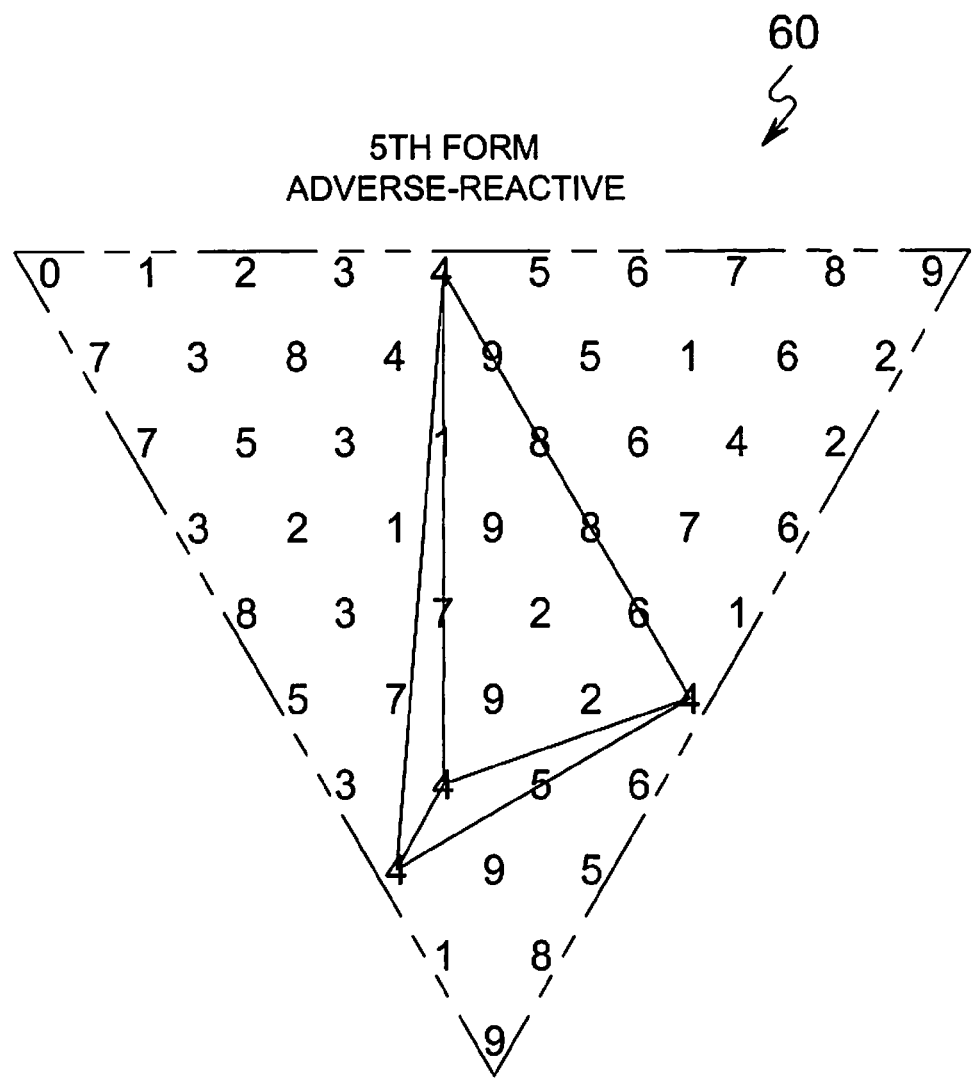

FIG. 16 is an illustrative view of the method of selected lining within a cyphometric triangle.

FIG. 17A is an illustrative view of the method of selected lining within a cyphometric triangle.

Figure 17B:
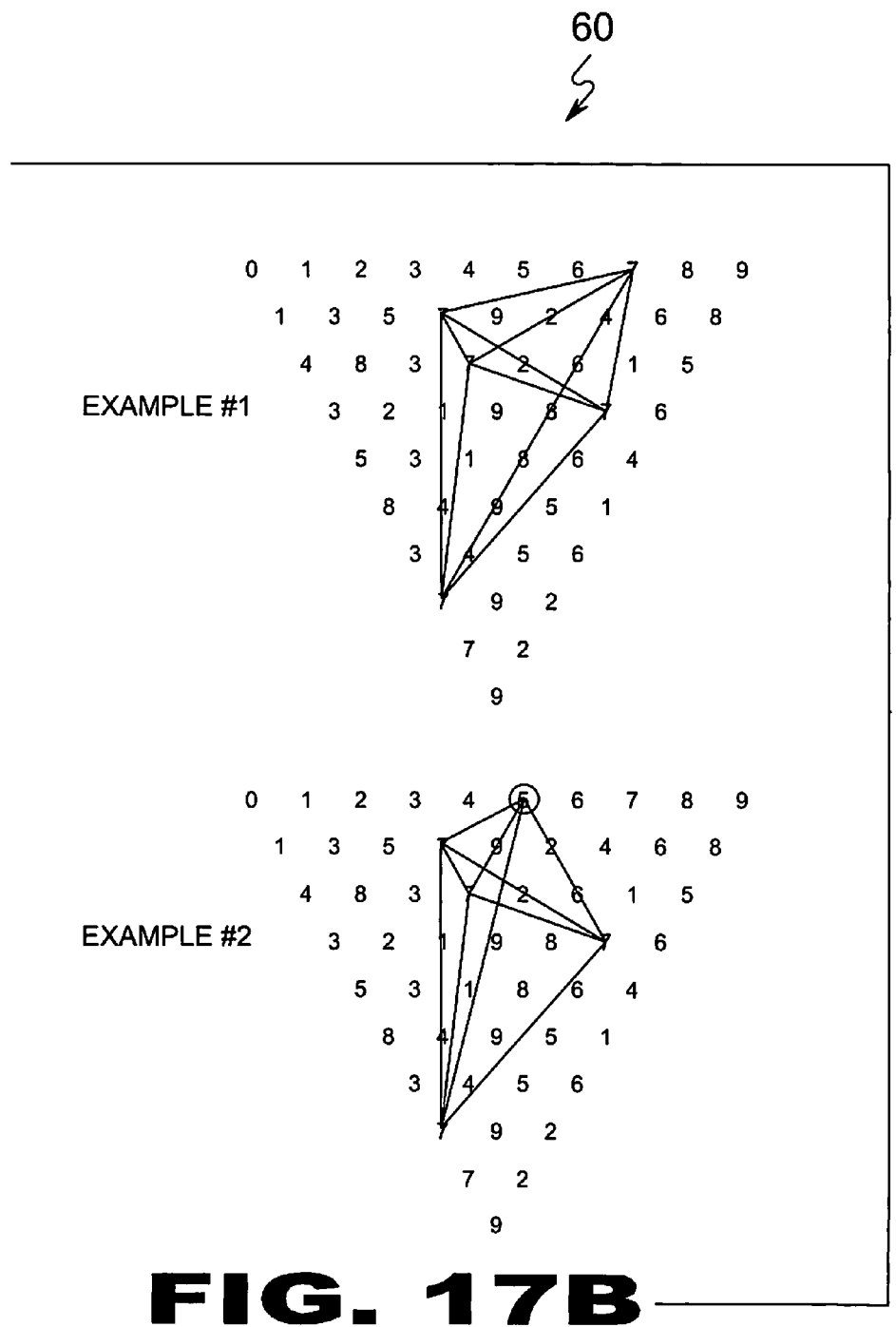

FIG. 17b is an illustrative view of the method of selected lining within a cyphometric triangle to form "alternate ciferglifs".

FIG. 18 is an illustrative view of the method of scale lining within a cyphometric triangle.

Figure 19:
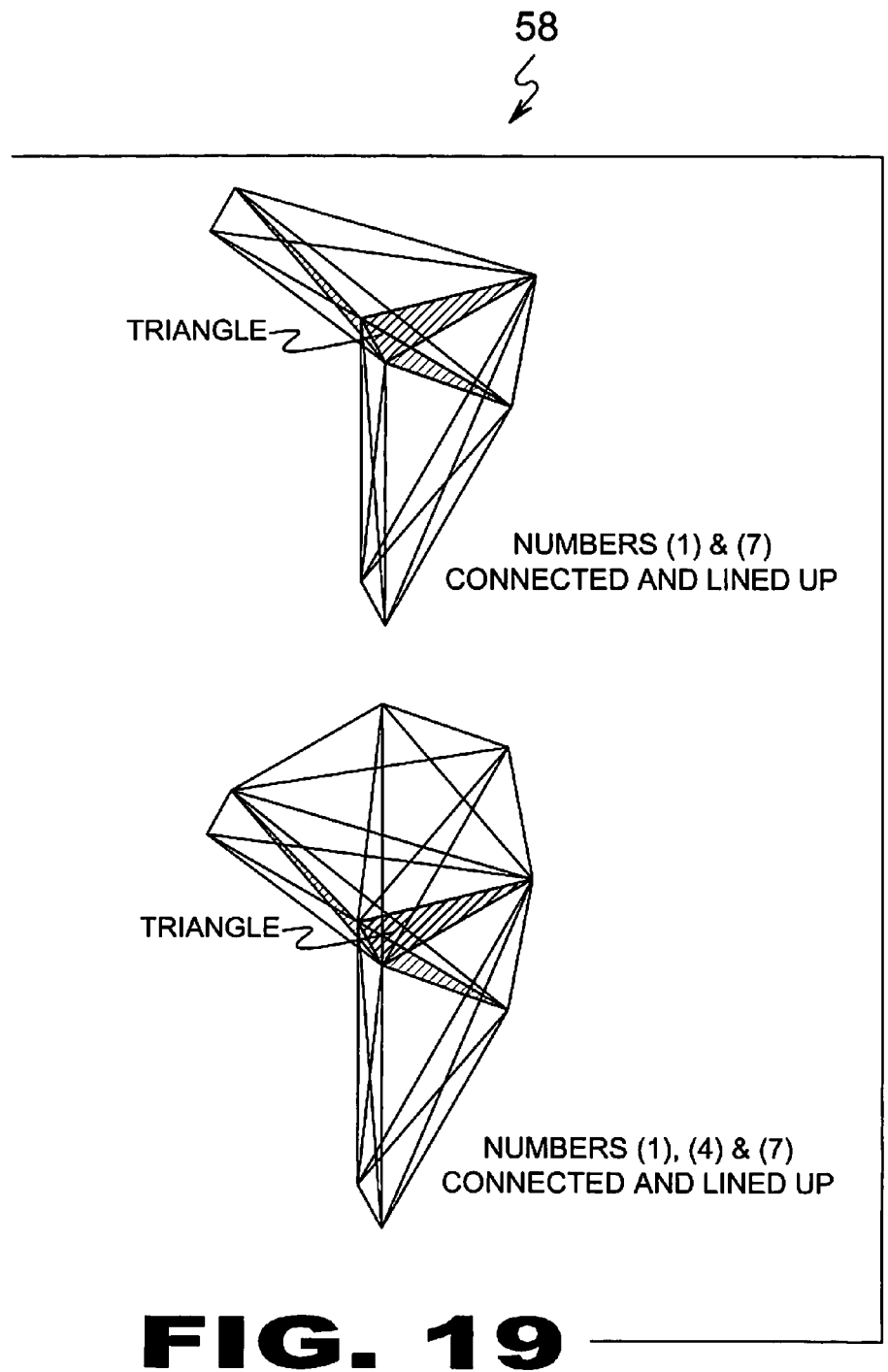

FIG. 19 is an illustrative view of the method of scale lining within a cyphometric triangle.

Figure 20:
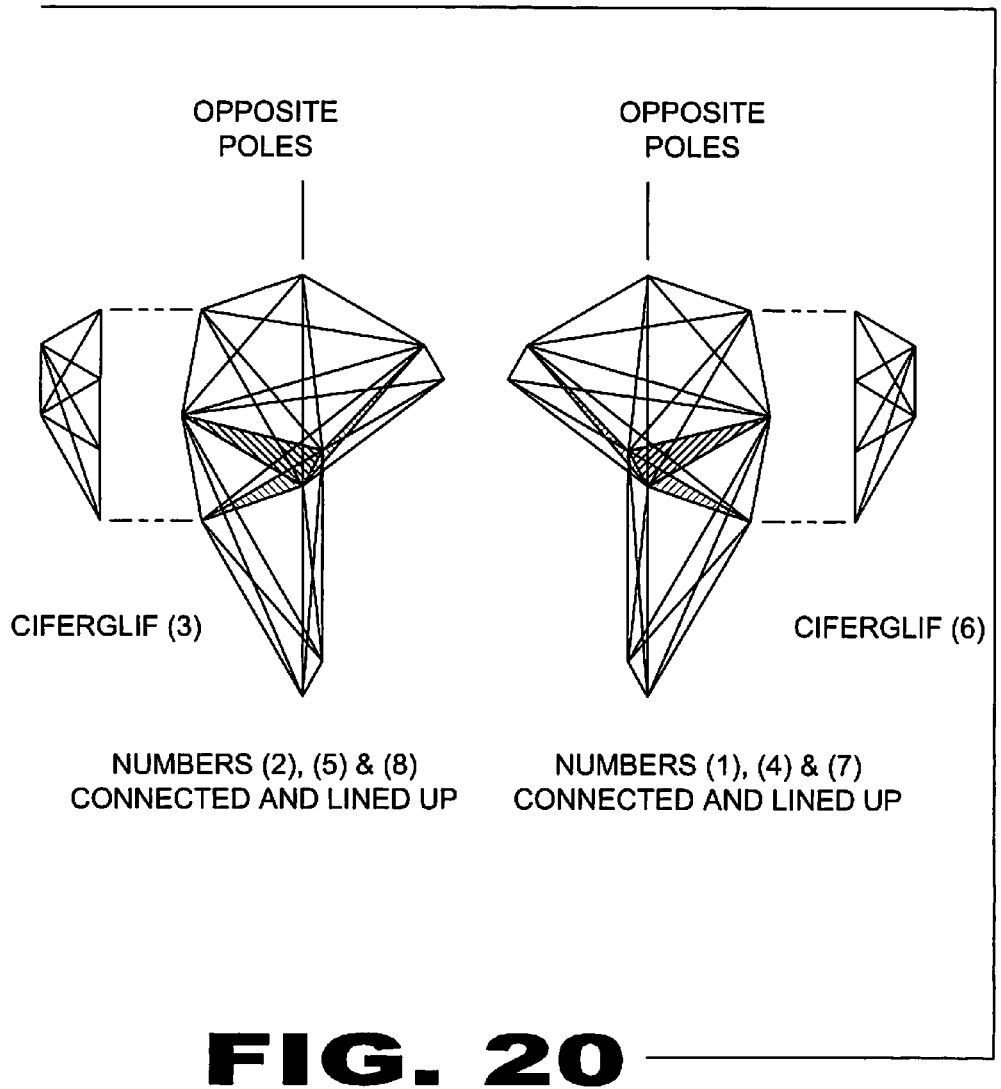

FIG. 20 is an illustrative view of the method of scale lining within a cyphometric triangle.

Figure 21:
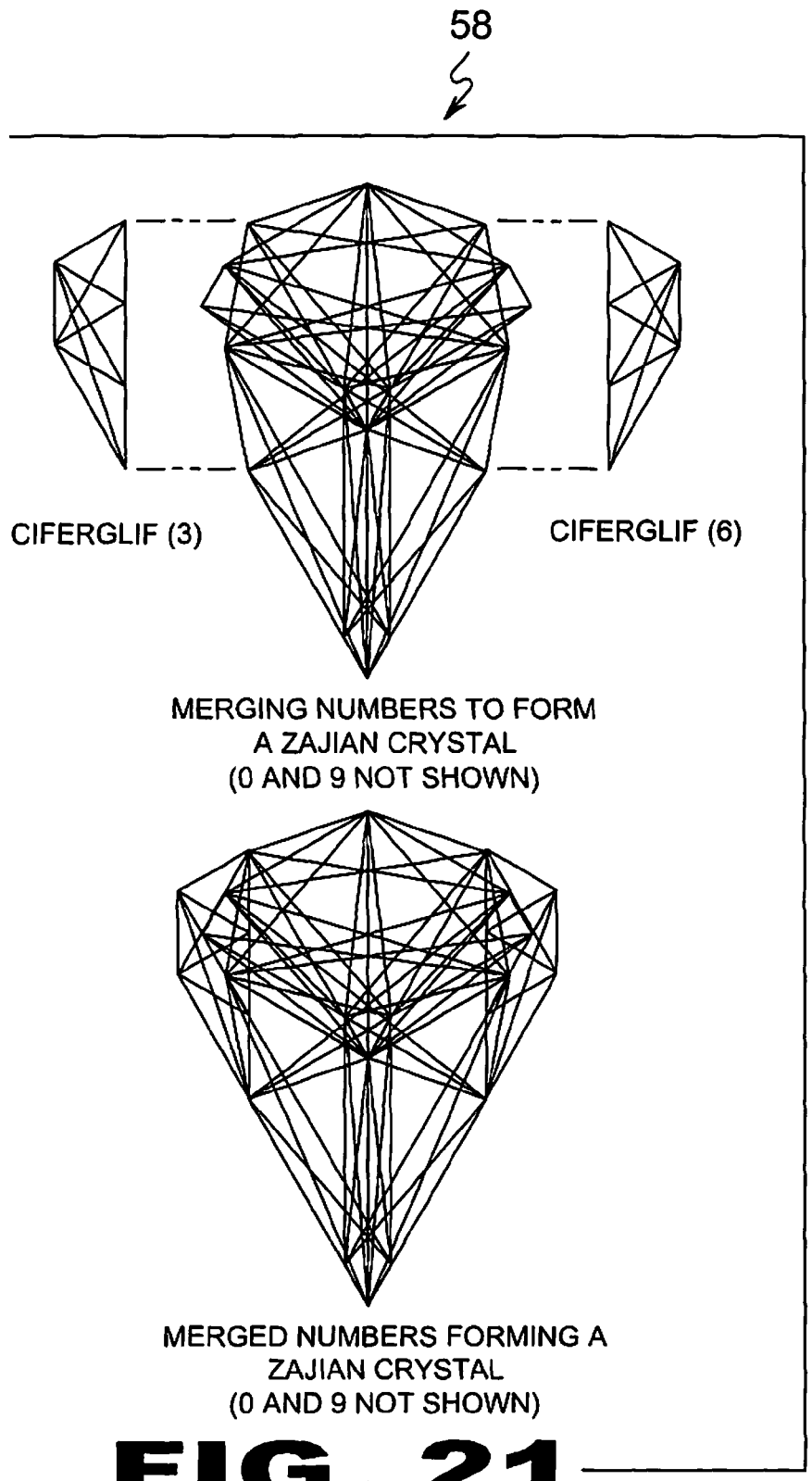

FIG. 21 is an illustrative view of the method of scale lining within a cyphometric triangle.

Figure 22:
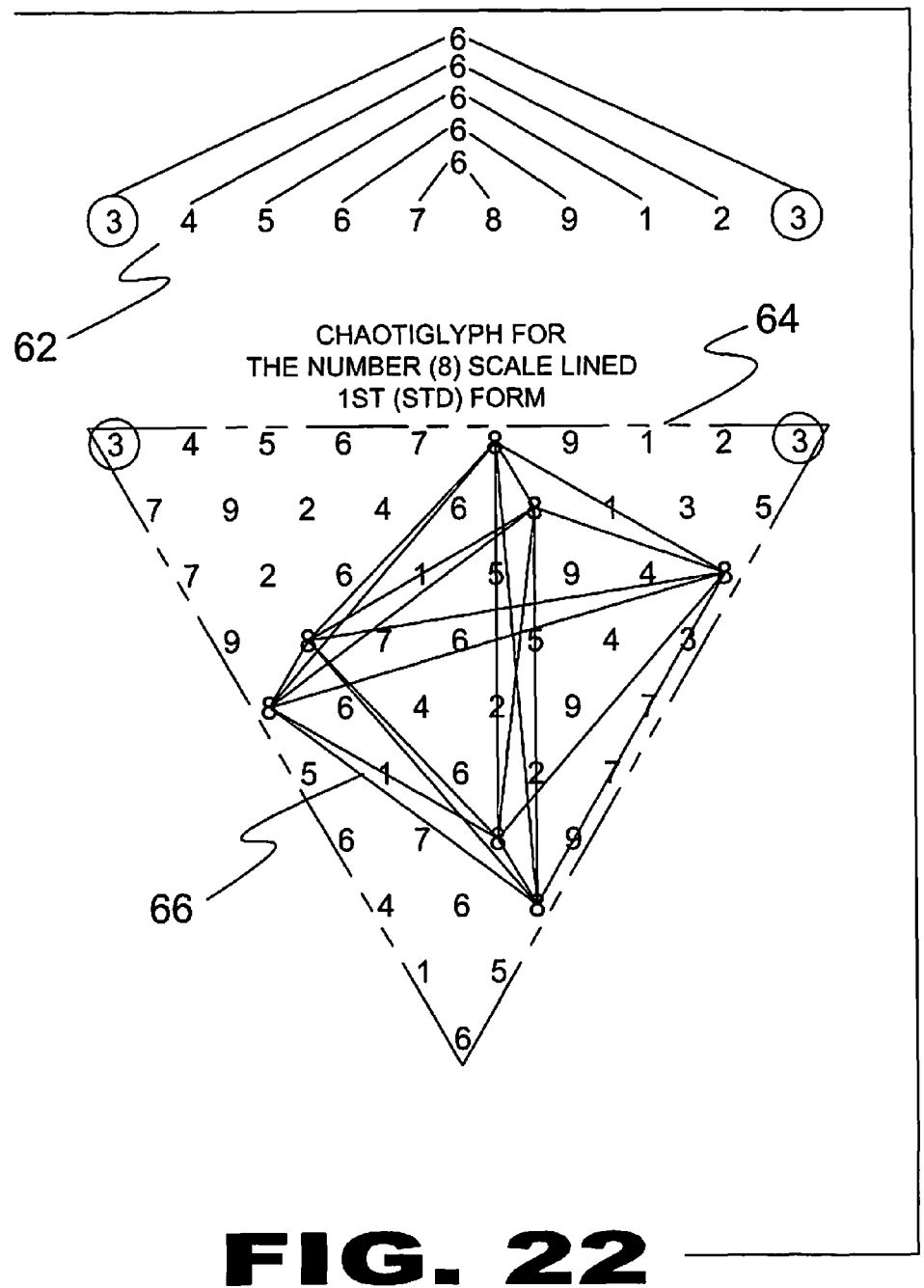

FIG. 22 is an illustrative view of the method of creating a chaotiglyph.

Figure 23:
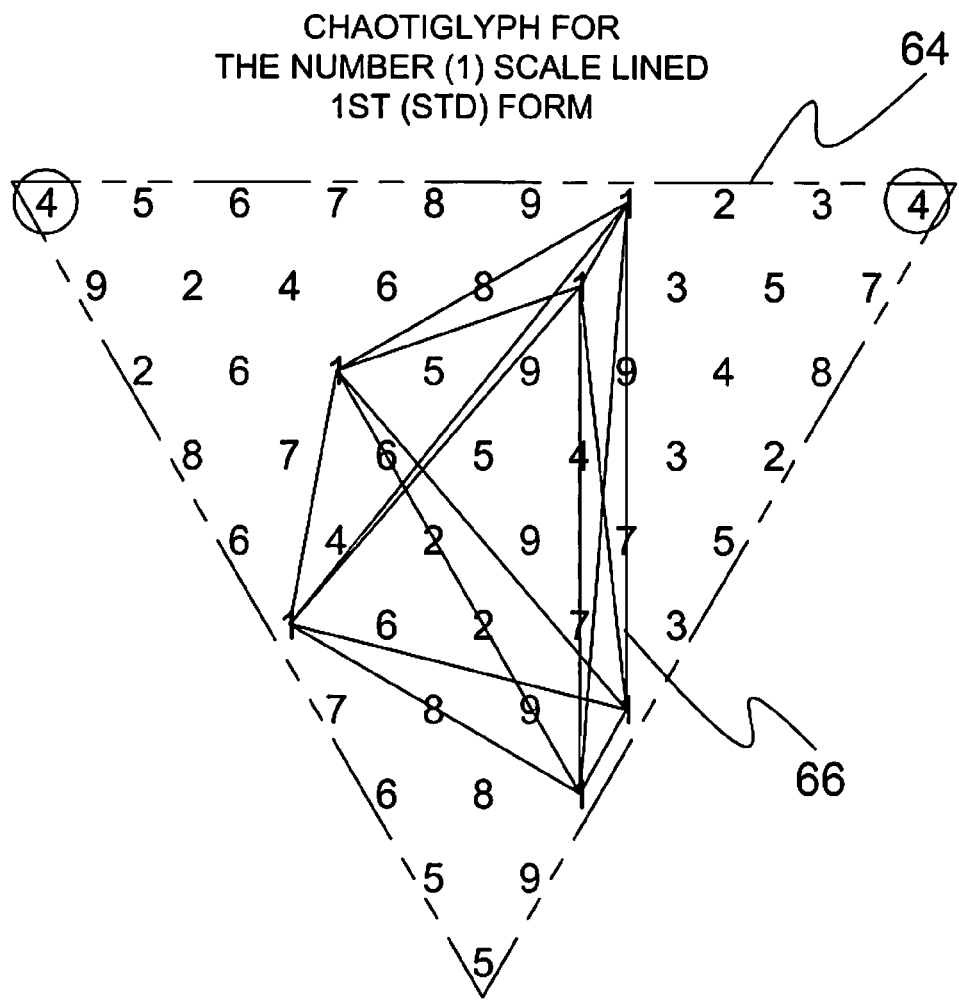

FIG. 23 is an illustrative view of the method of creating a chaotiglyph.

Figure 24:
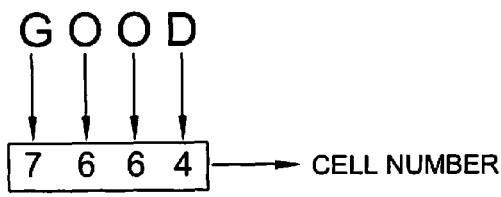

FIG. 24 is step one of the present invention.

FIG. 25 is step two of the present invention.

FIG. 26 is step three of the present invention.

Figure 27:
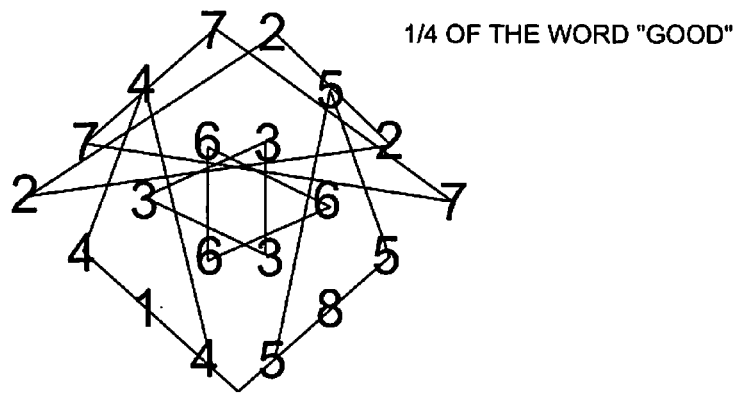

FIG. 27 is step four of the present invention.

Figure 28:
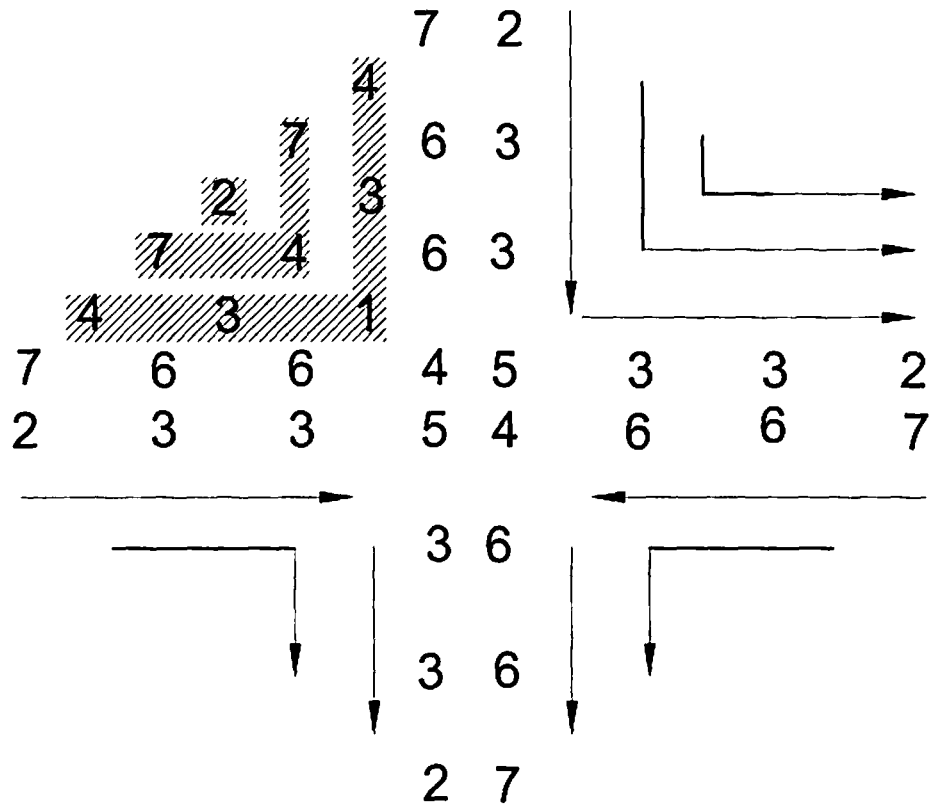

FIG. 28 are examples of the present invention.

Figure 29:
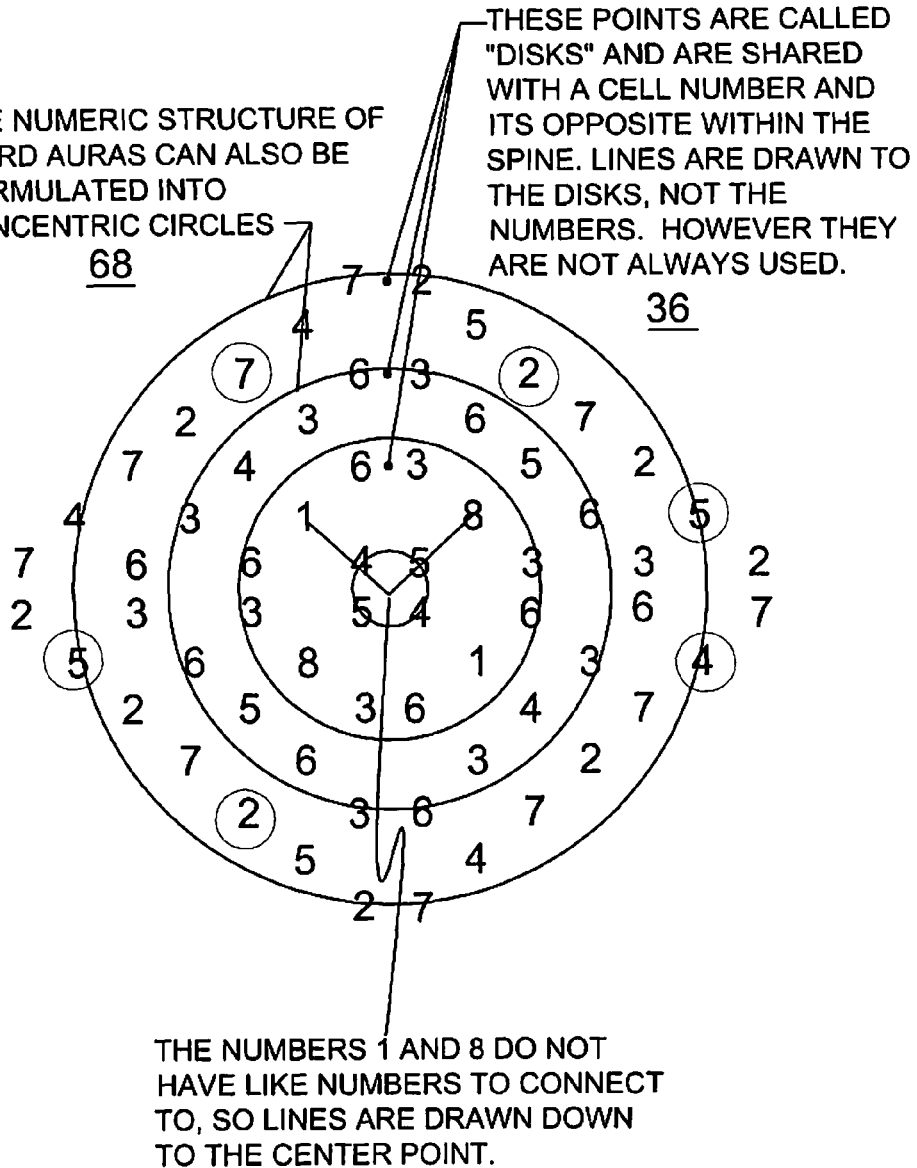

FIG. 29 are examples of the present invention.

FIG. 30 are examples of the present invention.

Figure 31:
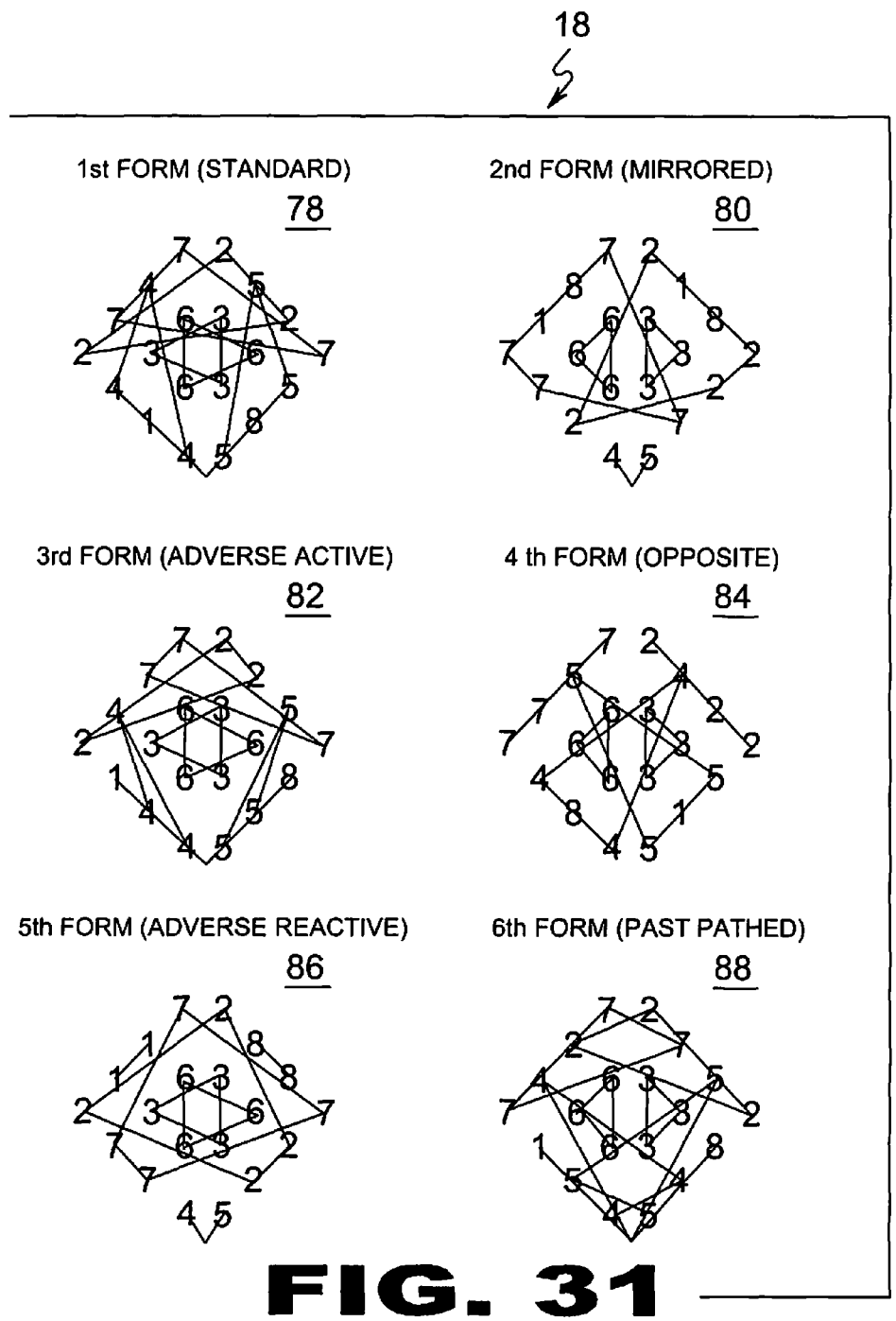

FIG. 31 are examples of the present invention.

FIG. 32 are examples of the present invention.

FIG. 33 is an illustrative view of word aura code system of the present invention.

LIST OF REFERENCE NUMERALS

With regard to reference numerals used, the following numbering is used throughout the drawings.

10 Cyphometry
12 Ciferglifs
16 Chaotiglyphs
18 Word Auras
20 Cyphometric Number Scale
22 Cyphometric Triangle
24 Top Cyphometric Number Scale
26 Bottom Cyphometric Number Scale
28 Cyphometric Opposite Numbers
30 Vertical Cyphometric Number Scale
32 Horizontal Cyphometric Number Scale
34 Angled Cyphometric Number Scale
36 Disks
38 Adding Formula Chart for Cyphometric Number Scale
40 Code Forms
42 Code Forms Relationship
44 Binding Opposites
46 Platonic Solids
48 Numeric Wave Lengths
50 Periodic Tiling
52 Illustrative Line Structure
54 Numeric Theology
56 Based Lining
58 Scaled Lining
60 Selected Lining
62 Chaosomtric Number Scale
64 Chaosomtric Triangle
66 Chaotiglyph
68 concentric circles/adding and structural arrangement
70 Adding Formula Chart for Word Auras
72 Word Code
74 Word Aura Spine
76 Cell Number
78 $1^{st}$ Form—Standard
80 $2^{nd}$ Form—Mirrored
82 $3^{rd}$ Form—Adverse Active
84 $4^{th}$ Form Opposite
86 $5^{th}$ Form Adverse Reactive
88 $6^{th}$ Form Past Pathed

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
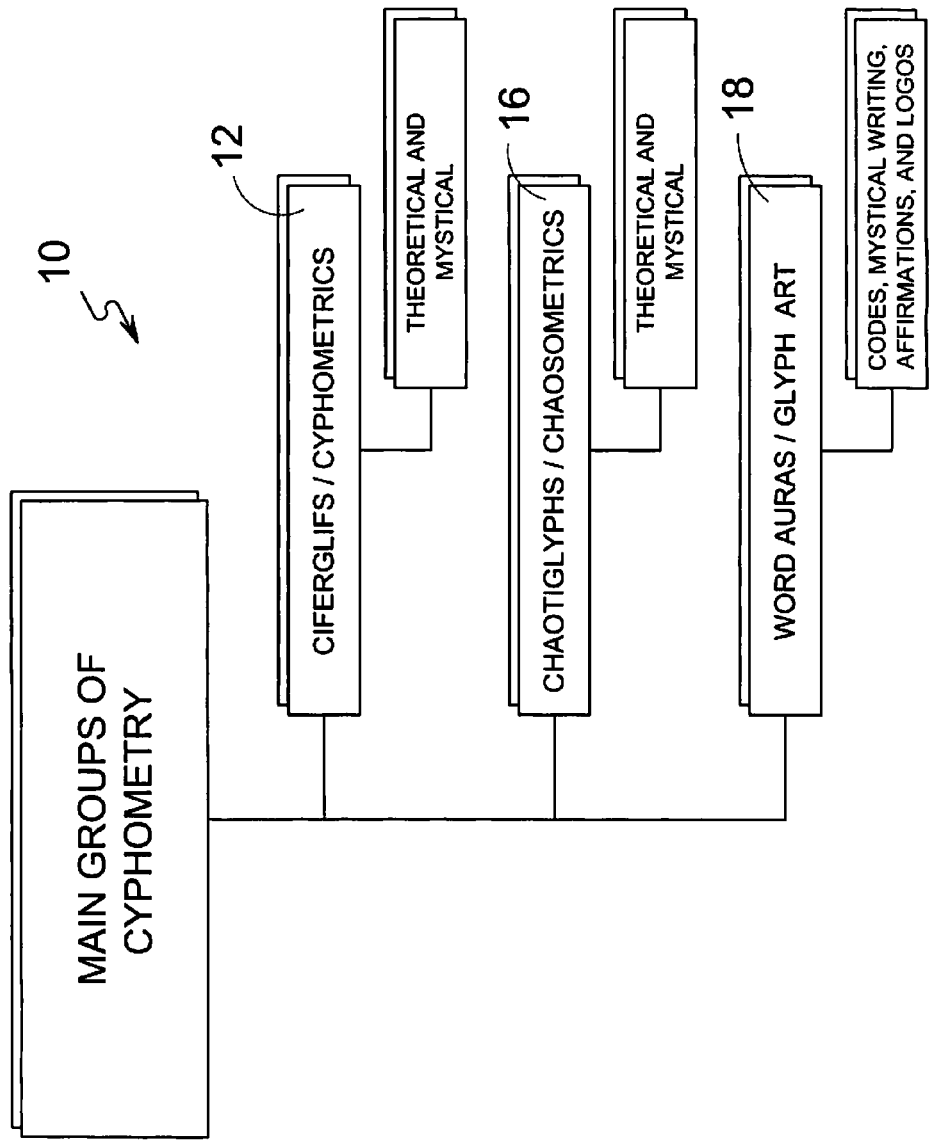
FIG. 1 is a block diagram of the main types of cyphometry.

FIG. 1 is a block diagram of the main types of cyphometry (10). Cyphometry (10) is an esoteric mathematical system that is the direct result of a comparative study of the complex geometric patterns that are formed through specific adding formulas within its fixed number scales. Cyphometry (10) presents a unique theoretical and mystical insight as to how the secrets and relationships between the digits zero (0) and nine (9) in correlation with the other numbers relate to nature and to the human psyche. Cyphometry (10) also contains a built-in secret writing/mutative code system that is based on a set key and/or predetermined rules that apply an abstract methodology to the three basic forms of written/oral communication; numbers, letters, and symbolism.

Figure 2:
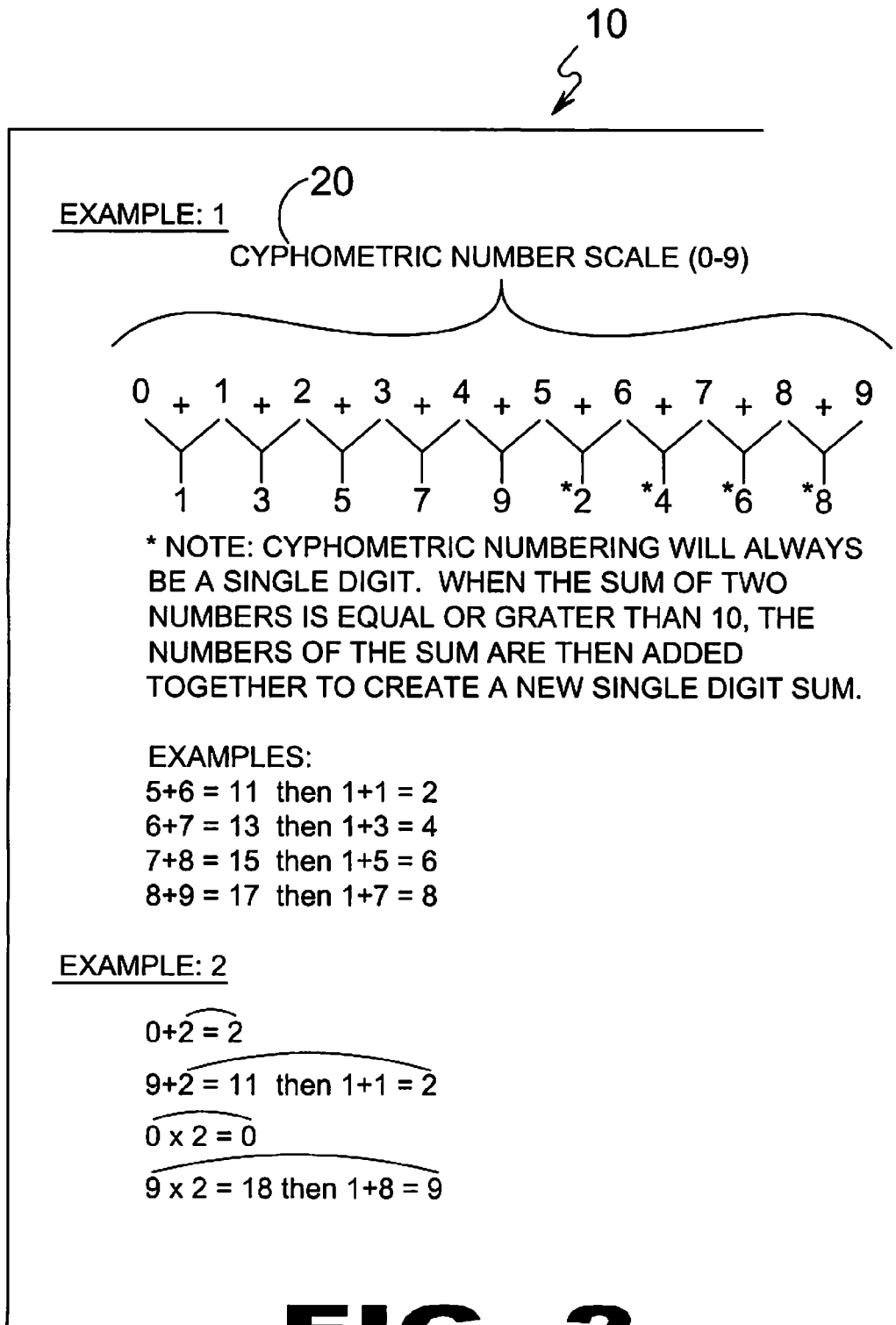
FIG. 2 is an illustrative view of the cyphometric numbering scale and space adding method.

FIG. 2 is an illustrative view of the cyphometric numbering scale and space adding method. Example 1 depicts the Cyphometric Number Scale (20) (CNS) and a first series of space adding. The CNS and space adding are used to create ciferglifs. Space adding utilizes the sum of the adjacent numbers and the resulting sum is placed centrally below. Space adding is repeated continuously until a single digit is present. Once all the space adding is complete, a Cyphometric Triangle (22) is formed. Example 2 furthermore, 0 and 9 are the only two single digits that can act as opposites to their extremes numerically all the time. Note: that by adding 2 to 0 and 9 the sum reverts back to the 2, and by multiplying the 2 to the 0 and 9 the sum reverts back to the 0 and 9.

Figure 2A:
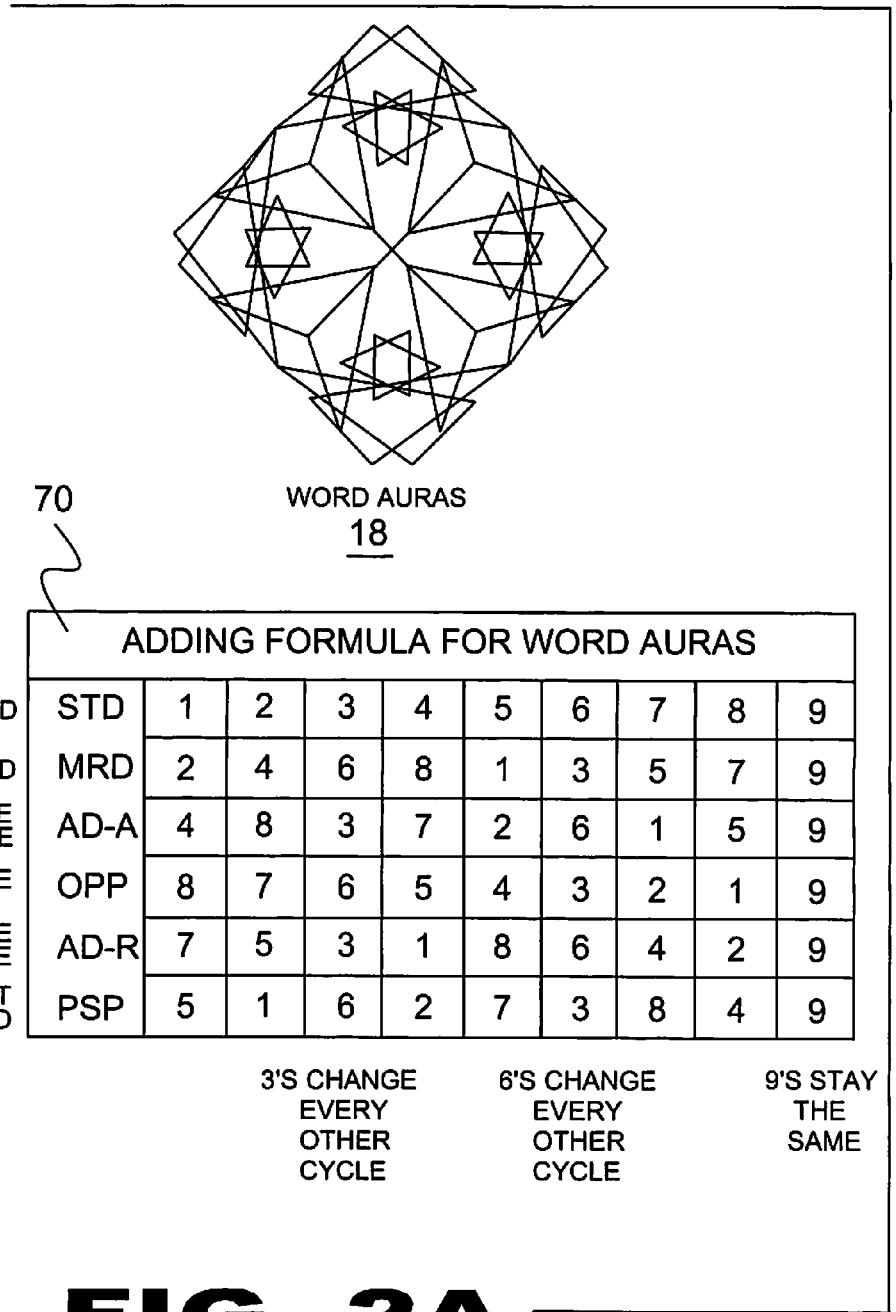
FIG. 2A is a formula chart of the present invention.

FIG. 2A is a formula chart of the present invention. The present invention, Word Auras (18) are an abstract esoteric art form that utilize the three basic forms of written communication, numbers, letters and symbols. Any word in any written language can be given a numerical value and that number value can be translated into a geometric design or symbol. Taking a word and translating it into a number then transforming that number into a symbol. It is a kind of systematic fusion between mysticism and science, the impractical with the practical.

Figure 3:
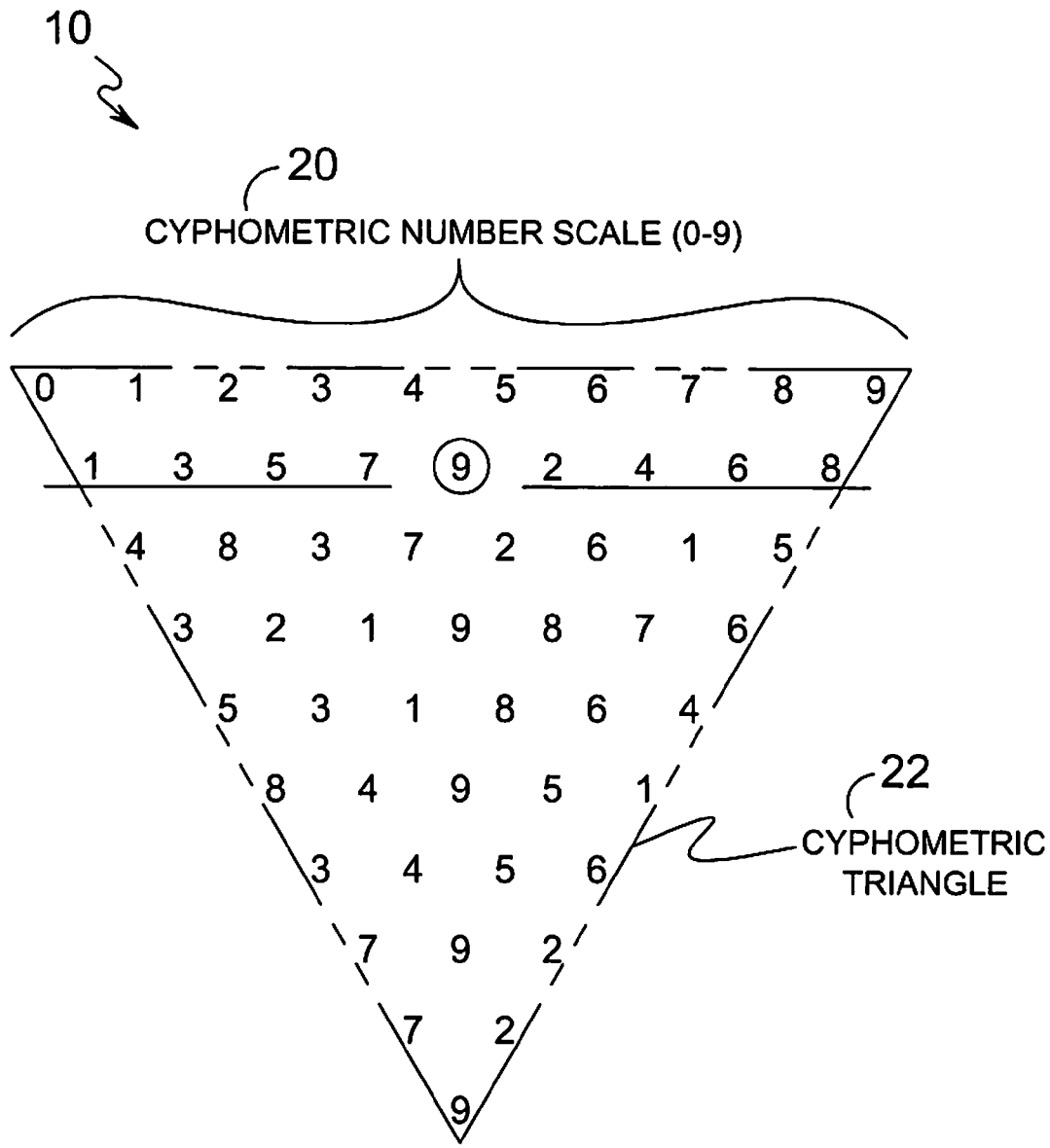
FIG. 3 is an illustrative view of space adding resulting in a cyphometric triangle.

FIG. 3 is an illustrative view of space adding resulting in a Cyphometric Triangle (22). Depicted is the Cyphometric Number Scale (20) (CNS) and space adding resulting in forming a Cyphometric Triangle (22). Note the second run of numbers below the CNS. Odd numbers are represented on the left side and even numbers are represented on the right side. In cyphometry (10), zero (0) and nine (9) are opposites to their extremes. Zero (0) represents nothing or un-created energy (9) represents everything or all created energy/future (the highest number of any sequence). As light and dark have the same effect at their extremes (not able to see), zero (0) and nine (9) have the same effect, except numerically. In turn, nine (9) can act as a zero (0) and zero (0) can act like as a nine (9) in defining cyphometry (10). The numbers one through eight within the (CNS) represent created energy both past and present.

Figure 4:
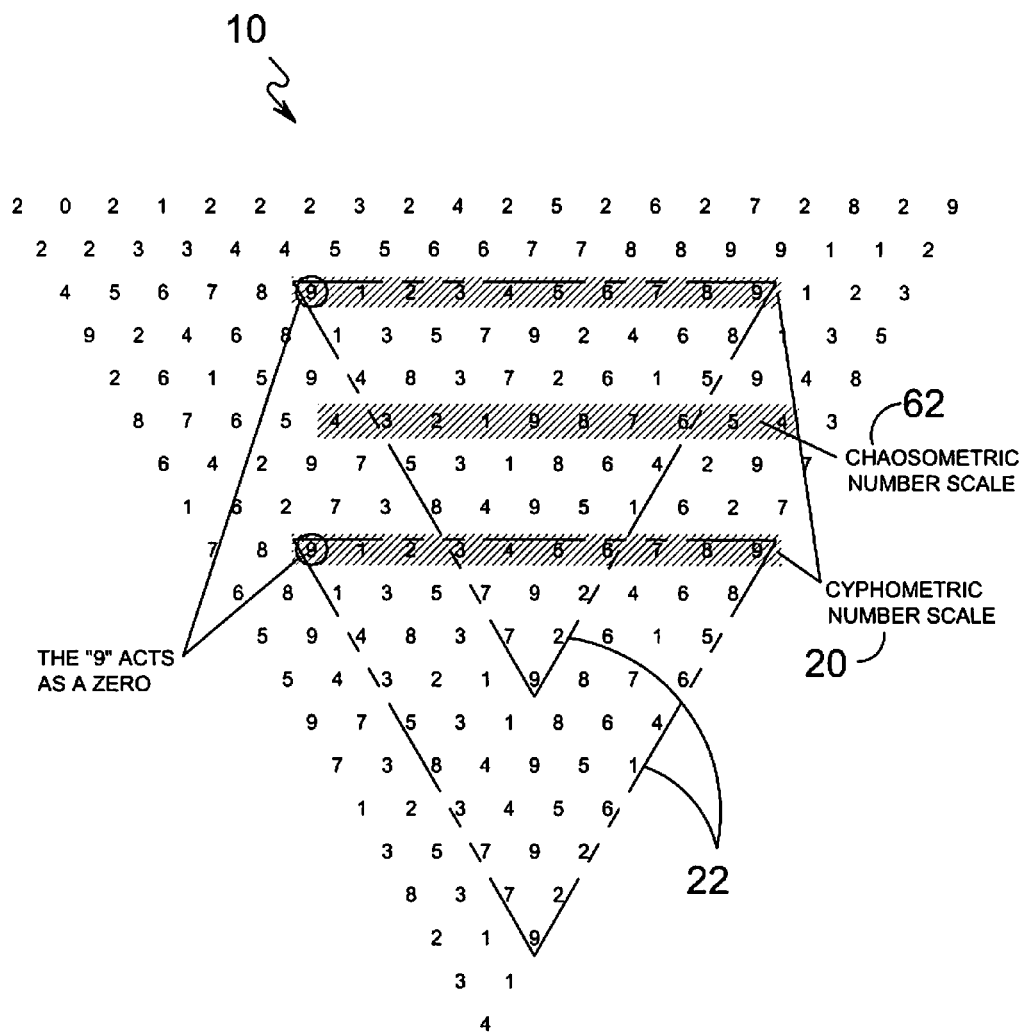
FIG. 4 is an illustrative view of space adding resulting in a cyphometric triangle.

FIG. 4 is an illustrative view of space adding resulting in a Cyphometric Triangle (22). Depicted is a pair of merged Cyphometric Triangle (22)s within a twenty (20)×twenty-nine (29) digit boundary. When space adding is applied to the Cyphometric Number Scale (20) in any length boundary, Cyphometric Triangle (22)(s) will manifest itself, as well as can chaosometric triangles (64).

Figure 5A:
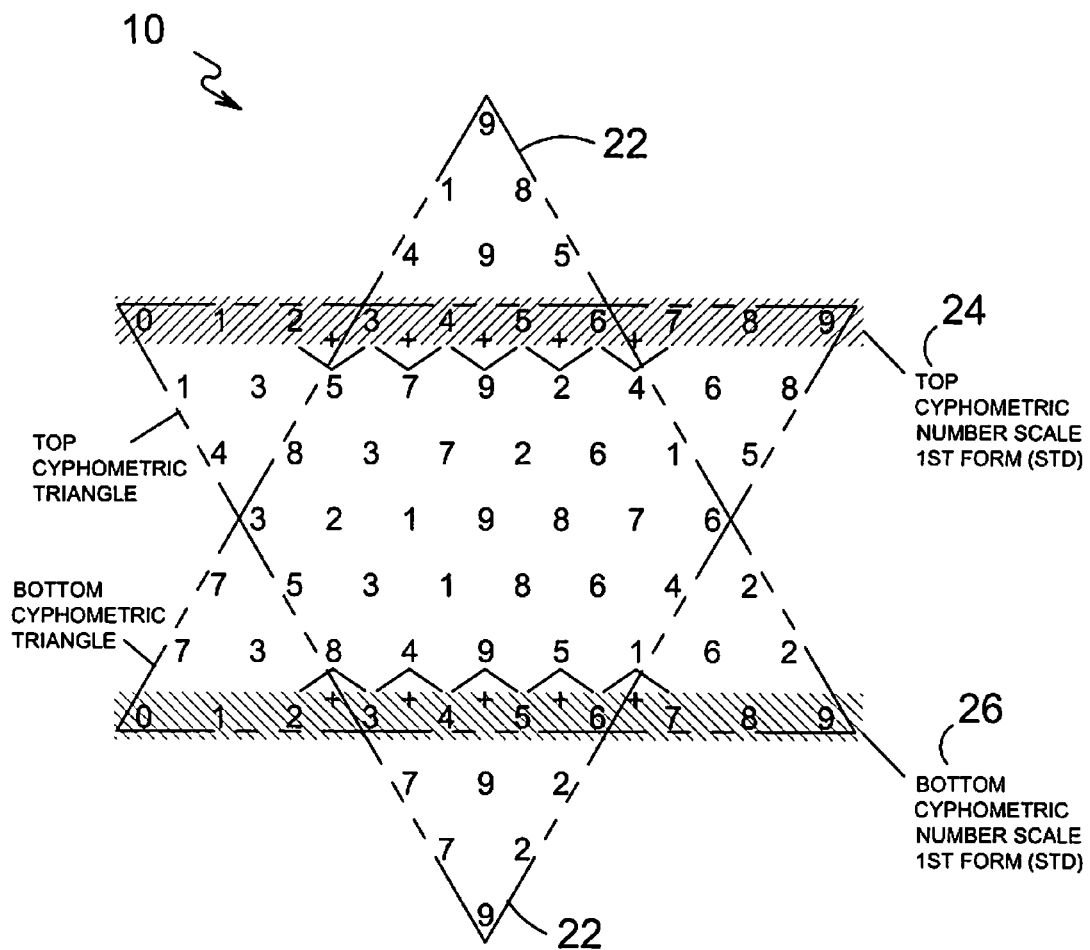
FIG. 5A is an illustrative view of space adding resulting in a cyphometric triangle.

FIG. 5A is an illustrative view of space adding resulting in a Cyphometric Triangle (22). Illustrated is a pair of Cyphometric Triangles (22) that can pass through one another and maintain their individual forms starting at the top Cyphometric Number Scale (24). The top Cyphometric Triangle (22) utilizes the 1st (standard) form for adding, and the bottom Cyphometric Triangle (22) utilizes the 5th (adverse-reactive) form for adding. This illustration depicts an abstract numeric reasoning as to how two dimensions can be within or side by side one another at different vibratory frequencies.

Figure 5B:
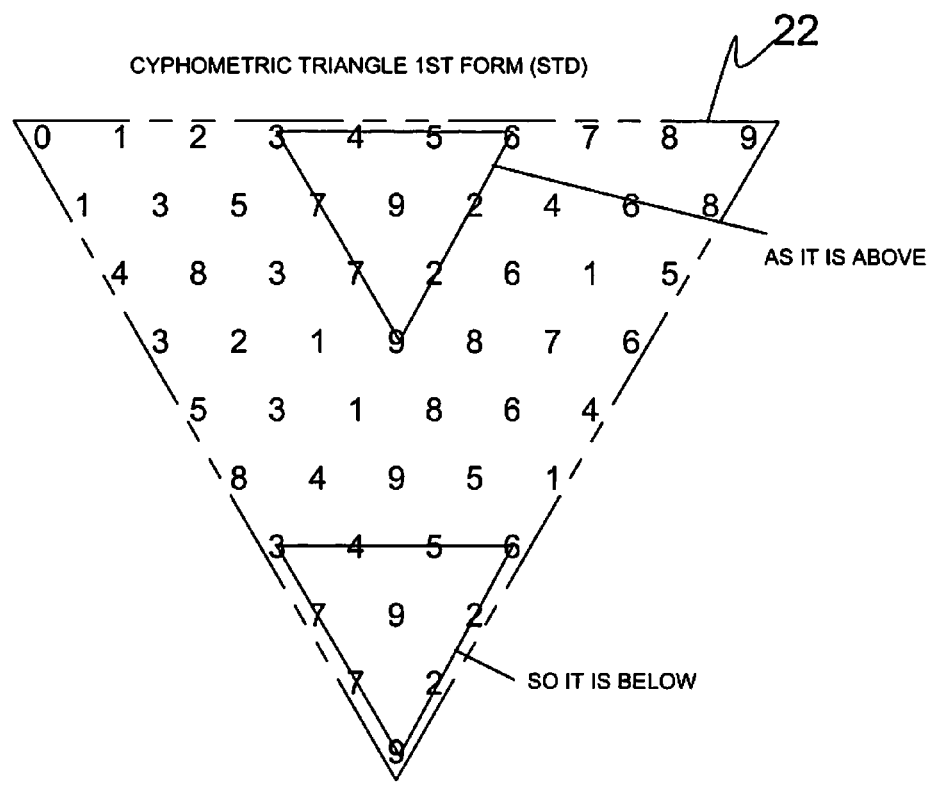
FIG. 5b is an illustrative view of an abstract numeric reasoning of a cyphometric triangle.

FIG. 5B is an illustrative view of an abstract numeric reasoning of a Cyphometric Triangle (22). Illustrated above is a depiction of an abstract numeric reasoning for the ancient mystic concept that states "as it is above, so it is below".

Figure 5C:
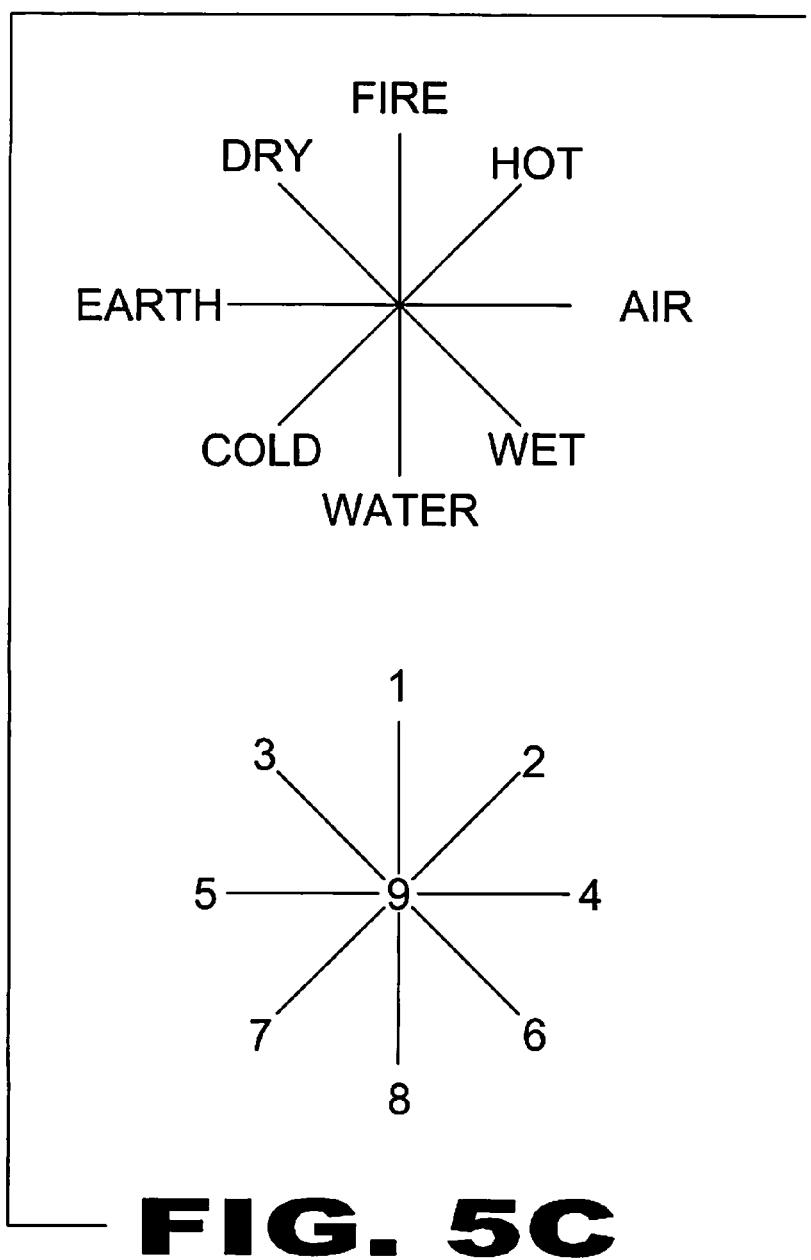
FIG. 5c is an illustrative view of the concept of duality according to cyphometric opposites.

FIG. 5C is an illustrative view of the concept of duality according to cyphometric opposites. The illustration above expresses a basic compact concept of duality in relation to the world in which we live in accordance to Cyphometric Opposite Numbers (28).

Figure 6:
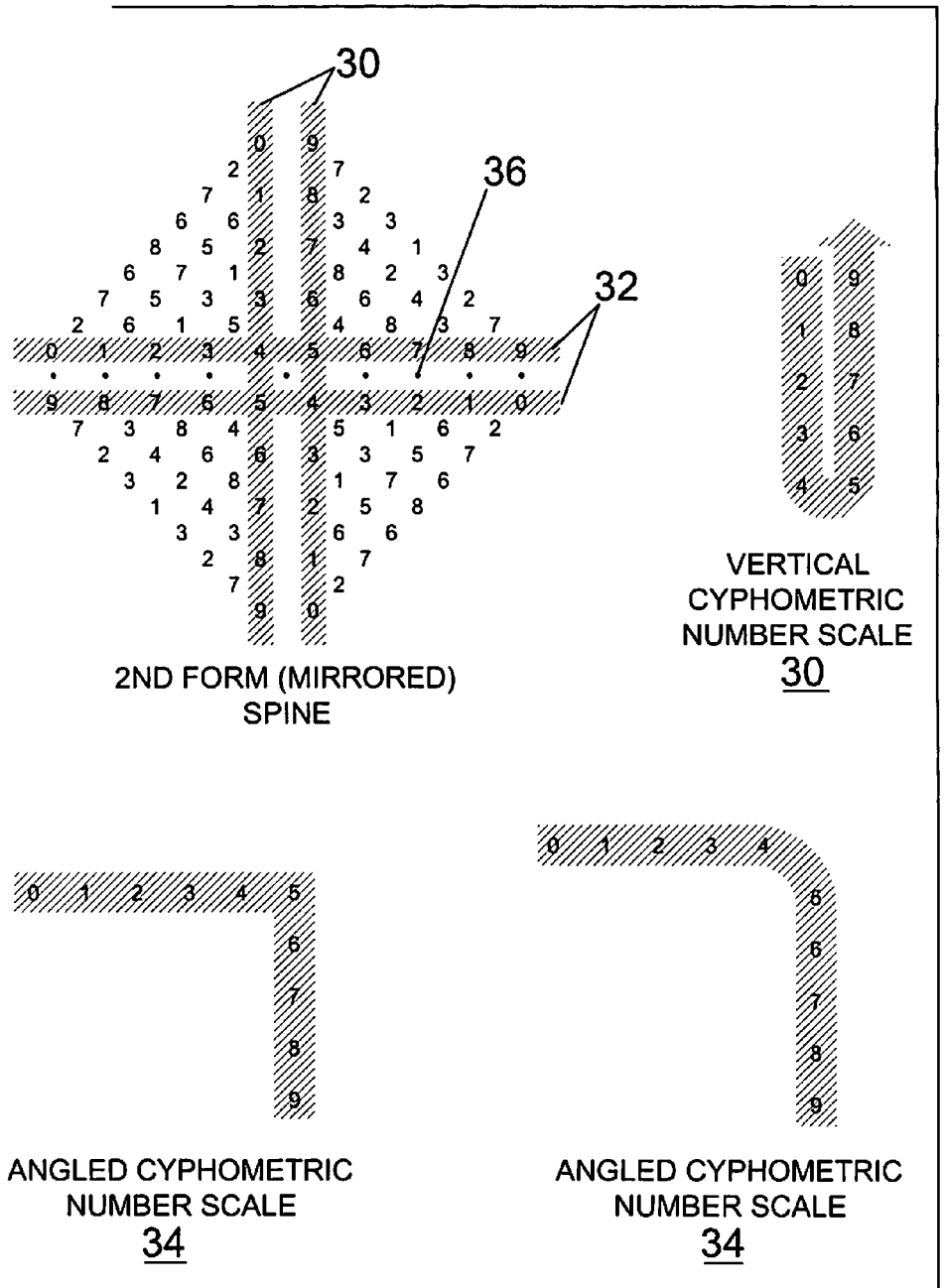
FIG. 6 is an illustrative view of various forms of cyphometric number scale.

FIG. 6 is an illustrative view of various forms of Cyphometric Number Scale (20). Shown are various forms of the Cyphometric Number Scale (20). The Cyphometric Number Scale (20) may be oriented in many ways as long as the scale begins with (0/9) and ends in (9/0). Also shown are points or "Disks (36)". Disks (36) can be shared by any number and its opposite within the Spine (74).

FIG. 7 is a chart for the adding formula for the Cyphometric Number Scale (38) and word aura Spine (74). Shown is the adding formula for CNS and word aura Spine (74). When working with either, the math is the same, any two numbers that are added together are, if necessary, reduced to a single digit. That sum is described in standard 1st form which is also the Cyphometric Number Scale (20) (0 thru 9). To identify the value of a number in another form, the intersection of the column and row is used. Example: 4+3=7. To find the adverse-reactive equivalent to 4+3, go to the column of the 1st form sum (7), move down the column until the adverse-reactive (5th form) row is reached at the left. The resulting adverse-reactive value of 4+3 is equal to 4. Furthermore, each code form row is a Cyphometric Number Scale (20) because they begin with 0/9 and end with 0/9, and the numbers in between are opposites of each other at any given point within the scale. However, 0 and 9 are not always used.

Figure 8A:
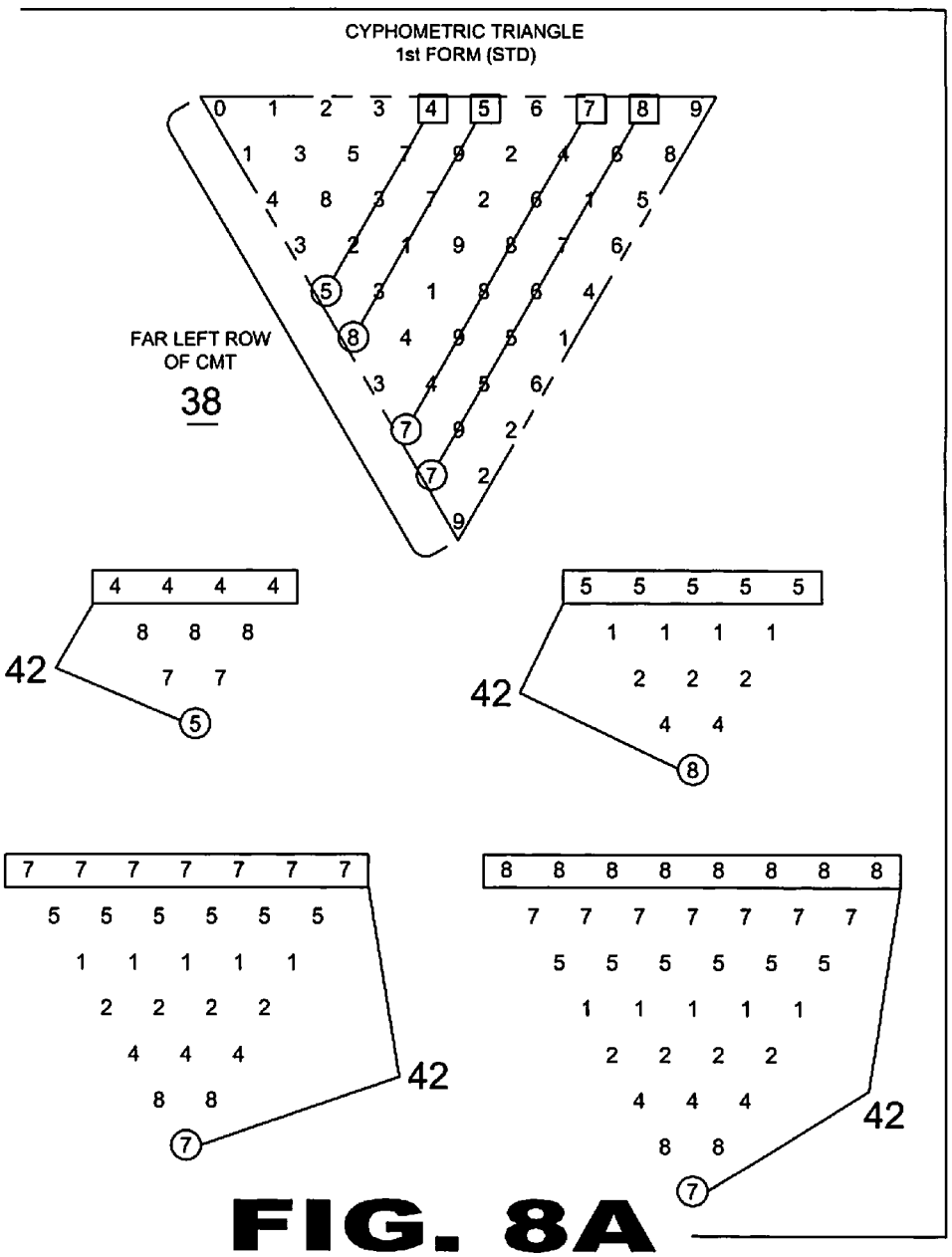
FIG. 8A is an illustrative view describing the derived code forms relationship between the cyphometric number scale and the far left row of the cmt.

FIG. 8A is an illustrative view describing the derived code forms relationship (42) between the Cyphometric Number Scale (20) and the far left row of the cmt. The above examples depict that any number within the Cyphometric Number Scale (20) that has its quantitative value of itself spaced added will result in the last number of the far left row of the cm triangle.

Figure 8B:
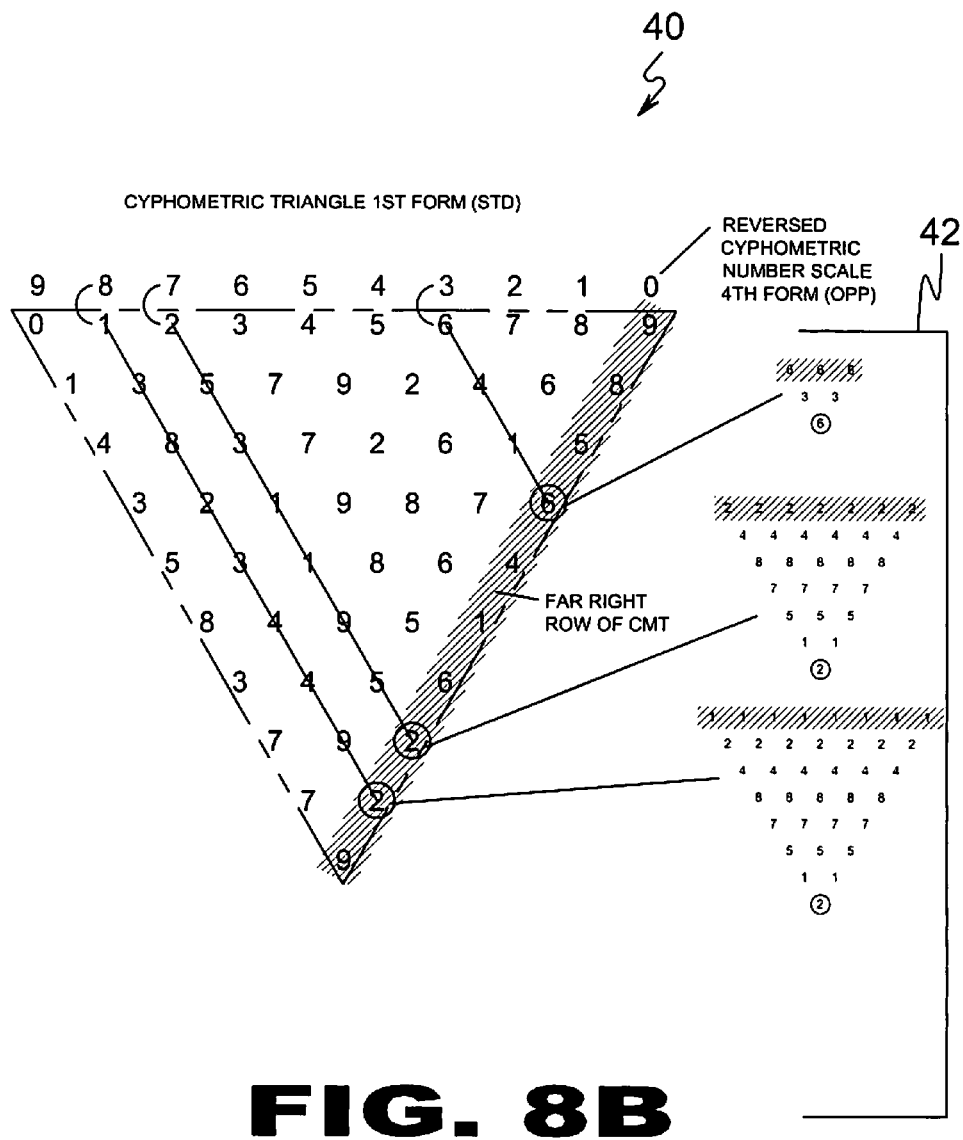
FIG. 8b is an illustrative view describing the derived code forms relationship between the reversed cyphometric number scale and the far right row of the cmt.

FIG. 8B is an illustrative view describing the derived code forms relationship (42) between the reversed Cyphometric Number Scale (20) and the far right row of the cmt. The above examples depict that by adding the reversed Cyphometric Number Scale (20) (4th form opposite) above the Cyphometric Number Scale (20) in the first form (std) and has its quantitative value of itself space added will result in the last number of the far right row of the Cyphometric Triangle (22). Three sixes, seven twos, and eight ones.

Figure 9:
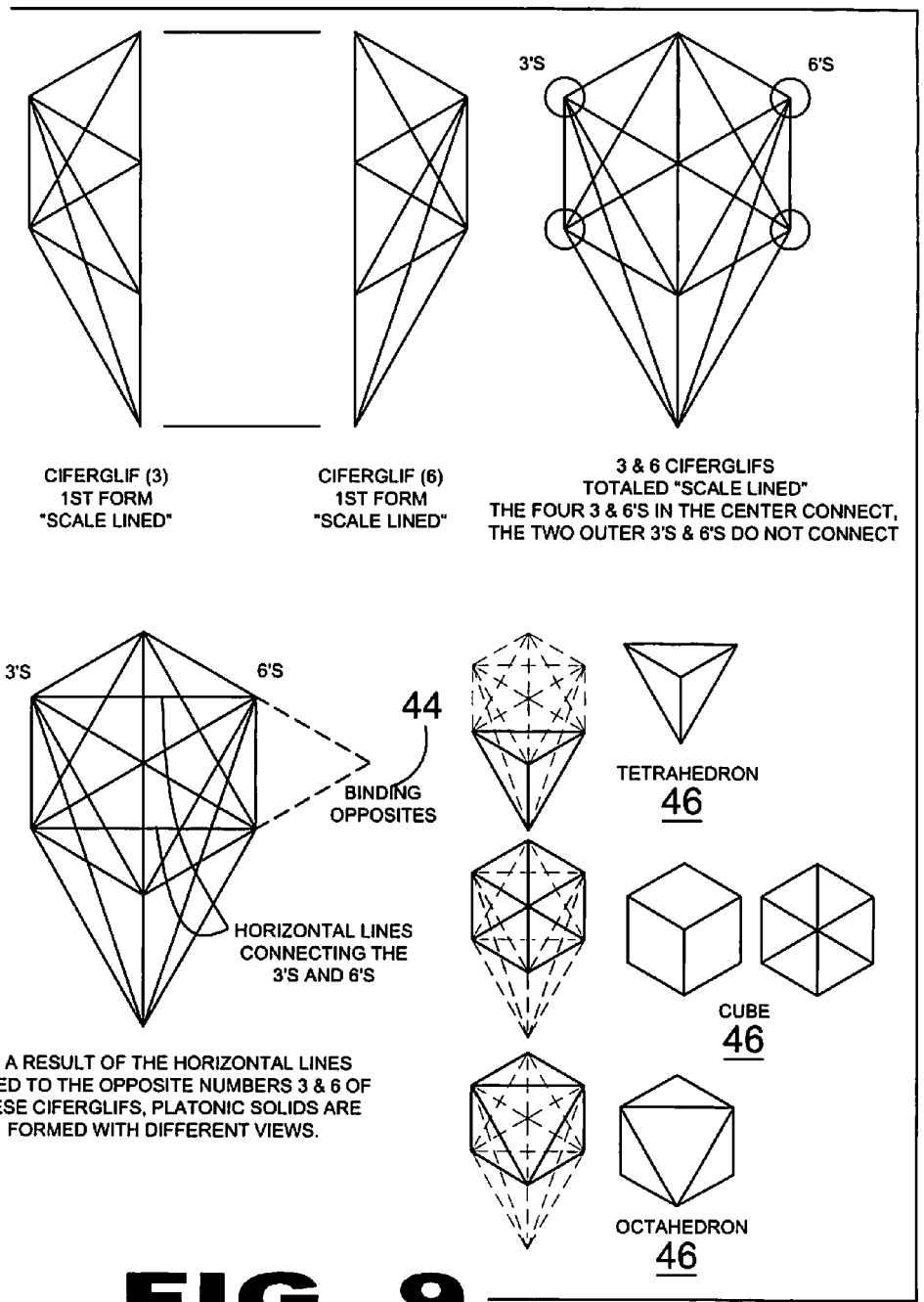
FIG. 9 is an illustrative view of the 3 and 6 ciferglifs in the 1st form depicting binding opposites to create platonic solids.

FIG. 9 is an illustrative view of the 3 and 6 Ciferglifs (12) in the 1st form depicting Binding Opposites (44) to create Platonic Solids (46). All Ciferglifs (12) can connect to each other in some fashion and lines can be added to the numbers that are not connected as long as they are opposites (1 & 8) (2 & 7) (3 & 6) or (4 & 5). This connection is called binding.

FIG. 10 is an illustration depicting a chart for the adding formula used to create Numeric Wave Lengths (48). Ciferglifs (12) depict solids, using the different code forms, however, you can create a sphere like structure by changing the code into what are called Numeric Wave Lengths (48). Numeric Wave Lengths (48) are created by connecting like numbers. Like Ciferglifs (12), the formed Numeric Wave Lengths (48) are opposites. Depicted above shows a #4 wave length and #5, its opposite.

FIG. 11A is an illustrative view describing the derived code forms relationship (42) within the Cyphometric Number Scale (20) and the Cyphometric Triangle (22). Example "A" denotes all cn scales add to a total of 45. Additionally there is six of each numeral in the Cyphometric Triangle (22), of which when added, the sum is always equal to 270 (270/6=45). Example "B" denotes a repetitive sum of 9. Whether vertical, horizontal or diagonal, when any four numbers are added together forming a diamond shape, the sum will always be 9 when broken down to a single digit. Example "C" denotes "the tree of life", ancient mystic Jewish symbol of the structure of god/creation. The symbol is made from the numbers 3, 6, and 9. Individual Ciferglifs (12) can make this structure with a multidimensional view.

FIG. 11B is an illustrative view describing a common form of Periodic Tiling (50). Cyphometry (10) is a non-conventional geometry, however, one can create many practical applications such as tiling in an abstract way. The upper illustration depicts a Cyphometric Number Scale (20) ordered in the same fashion as with cell numbers (76) in Word Auras (18). Using ¼ of the full structure and select lining. (note: by using only the structures made by 3 and 6, one can create a simple form of Periodic Tiling (50). Periodic Tiling (50) is depicted in the lower illustration.

FIG. 11C is an illustrative view of an insect composed of lined opposite numbers with straight lines. The figure is formed by using the same structure from FIG. 11*b* which is a vertical Cyphometric Number Scale (30) added on both sides in the 1st form (std), spaced added, and again spaced added on the four sides to form a square and yet spaced added once more on the flat sides of the square to form a four pointed star. The end result in lining opposite numbers in this instance, becomes an insect.

FIG. 11D is an illustrative view describing cyphometry (10) as a mathematical system that expresses a Numeric Theology (54). Cyphometry (10) as a mathematical system that expresses a Numeric Theology (54) by using an abstract methodology to the 3 basic forms of written/oral communication; numbers, letters, and symbols. It has been said that "love is what makes the world go round". As depicted in the illustrations above, by using basic cyphometry (10), one can find a numeric reasoning for this thought.

FIG. 12 is an illustrative view describing the derived code forms. Depicted are the Code Forms (40) for Word Auras (18) and Ciferglifs (12). The Code Forms (40) are derived from the Cyphometric Triangle (22) in the 1st standard form. By spaced adding the numbers of each row in the same single digit format, each of the first six rows depict a single repetitive digit that is in turn used to identify the code form. Note: the repeat digit is represented in each of the Code Forms (40) in the same position within the Cyphometric Triangle (22). Note: all six adding formulas shown above are depicted with the Cyphometric Number Scale (20) being in the 1st form (std). The other forms can be used as well.

FIG. 13 is a block diagram of the basic methods of lining within a Cyphometric Triangle (22). The basic methods of lining within a Cyphometric Triangle (22) are Based Lining (56), Scaled Lining (58), and Selected Lining (60). Selected Lining (60) is particularly useful in developing Platonic Solids (46) from Ciferglifs (12).

FIG. 14 is an illustrative view of the method of Based Lining (56) within a Cyphometric Triangle (22). There are six of each digit within a Cyphometric Triangle (22). Each digit has its own unique pattern in each of the six code forms. In the method of Based Lining (56), a line is drawn from each of the five digits to the same digit within the Cyphometric Number Scale (20). Illustrated is the number 4 based lined in the 5th form.

FIG. 15 is an illustrative view of the method of Scaled Lining (58) within a Cyphometric Triangle (22). There are six of each digit within a Cyphometric Triangle (22). Each digit has its own unique pattern in each of the six code forms. In the method of Scaled Lining (58), a line is drawn from each to a like number resulting in five lines starting from a given digit. Depicted above is the number 4 scaled lined in the 5th form.

FIG. 16 is an illustrative view of the method of Selected Lining (60) within a Cyphometric Triangle (22). There are six of each digit within a Cyphometric Triangle (22). Each digit has its own unique pattern in each of the six code forms. In the method of Selected Lining (60), the user selects a quantity less than six to interconnect. Depicted is a quantity of 4 of the number 4 selected lined in the 5th form. Selected Lining (60) is particularly useful in developing Platonic Solids (46) from Ciferglifs (12).

FIG. 17A is an illustrative view of the method of Selected Lining (60) within a Cyphometric Triangle (22). All Ciferglifs (12) as well as Chaotiglyphs (16) are made up of smaller geometric structures, primarily offset tetrahedrons and triangles. Each Cyphometric Triangle (22) and chaosometric triangles (64) will vary depending on the adding formula it's in. Illustrated are Cyphometric Triangle (22)s in the 1st adding form (standard) and using the ciferglif for the number 7 select lined.

FIG. 17B is an illustrative view of the method of Selected Lining (60) within a Cyphometric Triangle (22) to form "alternate Ciferglifs (12)". We have established lining "like" numbers within the Cyphometric Triangle (22) (7's with 7's, 8's with 8's) as shown in sample 1. However, one can line numbers in correlation to the adding formulas themselves, to create what is called "alternate Ciferglifs (12)". Using the number 5 within the (CNS) in example 2, the past pathed or 6th form of that number is 7. Simply, lines are drawn from the 5 to the 7's in a select manner for this illustration.

FIG. 18 are illustrative view of the method of scale lining within a Cyphometric Triangle (22). Depicted is a Ciferglifs (12) in the 1st form standard with scale lining for the numbers, 4, 1, and 7. The numbers 5, 8, and 2 are identical but mirror image because they are opposites. Shaded are triangle forms that repeat. The image at the bottom right shows these triangles from number 1 and 4 lined up. Note, even the symbols for these numbers are opposites. The 4, 1 and 7 are made up of only straight lines. Their opposites, 5, 8 and 2 have curves.

FIG. 19 is an illustrative view of the method of scale lining within a Cyphometric Triangle (22). Depicted are Ciferglifs (12) in the 1st form standard with scale lining for the numbers, 4, 1, and 7. All Ciferglifs (12) fit together like a puzzle in form or fashion. Ciferglifs (12) in this way illustrate geometrically the concept of connectivity much like the letters within the English alphabet. Example: the letters "L" and "F" can be found within the letter "E".

FIG. 20 are illustrative view of the method of scale lining within a Cyphometric Triangle (22). Depicted is a Ciferglifs (12) in the 1st form standard with scale lining for the numbers 4, 1, and 7. The numbers 5, 8, and 2 are identical but a mirror image because they are opposites. Shaded are triangle forms that repeat. Also shown are Ciferglifs (12) for 3 and 6 which also mirror each other.

FIG. 21 is an illustrative view of the method of scale lining within a Cyphometric Triangle (22). Depicted are Ciferglifs (12) in the 1st form standard with scale lining for the numbers 3, 4, 1, and 7. The numbers 6, 5, 8, and 2 are identical but a mirror image because they are opposites. When connected at common poles, a Zajian crystal is formed.

FIG. 22 is an illustrative view of the method of creating a Chaotiglyph (66). We have established that Ciferglifs (12) are created by using a fixed number scale (Cyphometric Number Scale (20)), Chaotiglyphs (16) on the other hand, utilize a Chaosometric Number Scale (62). A Chaosometric Number Scale (62) does not utilize the number (0) and must end with the number it began the sequence with. The same side adding principals apply in creating the Chaosometric triangle (64). Depicted is the Chaosometric Number Scale (62) that begins and ends with the number (3) and a scale lined Chaotiglyph (66) for the number (8) is created. Note: in the case of this Chaosometric Number Scale (62) that begins with 3 and ends with 3, the total being 6, the numbers in between at both ends of the scale also add to 6.

FIG. 23 is an illustrative view of the method of creating a Chaotiglyph (66). Depending on the form of a Chaosometric triangle (64) is in, they can create Ciferglifs (12) by using different numbers and are generally angled and can even be upside down. This is depicted in the above Chaosometric triangle (64) with number 4 to 4. The structure is a ciferglif that is created when the Cyphometric Number Scale (20) is added in the 5th form (ad-r) using the number 4. But with the Chaosometric triangle (64), the Chaotiglyph (66) made with the number 1 is upside down and to the left. The number 1 is the (ad-r) using the number 4. Its counterpart is referenced in FIG. 15.

FIG. 24 is step one of the present invention. Word Auras (18): are the only esoteric art in the world that combines the three basic forms of written communication, numbers, letters and symbols to form complex geometric designs derived from the numerical values given to the letters of words. The Word Code (72) depicted above is the preferred arrangement of letters of the alphabet, other arrangements may be defined to create different codes and would result in different shaped Word Auras (18).

FIG. 25 is step two of the present invention.

FIG. 26 is step three of the present invention.

FIG. 27 is step four of the present invention.

FIG. 28 are examples of the present invention.

FIG. 29 are examples of the present invention.

FIG. 30 are examples of the present invention.

FIG. 31 are examples of the present invention. There are six individual adding formulas for making Word Auras (18). Each adding formula creates a different design. This can be illustrated by using only a quarter of the word aura. Using the word "good" as an example:

FIG. 32 are examples of the present invention. Word Auras (18) are a great way to send coded messages or information from one party to another. Separate Word Auras (18) can interlock to form one design.

FIG. 33 is an illustrative view of word aura code system of the present invention. Word Auras (18) are specifically designed to send short quick messages. They can be sent separately or fused together inside one another at the center point to conceal their individual structures. Word Auras (18) are a code system that can mutate much like a virus, and has the ability to shape shift depending on the adding formula it is in. However one can change the Cell Number (76) instead of the adding formula and come up with the same geometric shape. Using the word "god" as an example in the 1st form (std) and change the Cell Number (76) to the 3rd form (ada) which changes the word "god" into the word "joy". Note: different numbers, but maintains the same geometric design.

While certain novel features of this invention have been shown and described and are pointed out in the annexed claims, the invention is not intended to be limited to the details above, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that fairly constitute essential characteristics of the generic or specific aspects of this invention.

What is claimed to be new and desired to be protected by Letters Patent is set forth in the appended claims:

1. A computerized cryptographic system called cyphometry, the system comprising:
   a computer processor coupled to a memory performing the following steps:
   a) providing a cyphometric number scale, said cyphometric number scale having ten digits, each digit being a single integer;
   b) establishing the cyphometric number scale horizontally with a space between each of the digits;
   c) creating a first subsequent number scale beneath the cyphometric number scale by employing space adding,
      wherein the first subsequent number scale includes a series of single digit integers on a horizontal line beneath the cyphometric number scale,
      wherein space adding generates a series of single digit integers for the first subsequent number scale,
      wherein each of the single digit integers of the first subsequent number scale are positioned beneath each space between integers of the cyphometric number scale above,
      wherein each said single digit integer of said first subsequent number scale are generated by adding the two single digit integers on either side of its respective space above and then reducing the total to a single digit integer;
   d) forming a cyphometric triangle by creating eight additional number scales, each additional number scale being positioned beneath the number scale from which is was generated, each of these additional eight number scales being created by employing space adding; and
   e) forming a ciferglif by drawing lines between some of the numbers in said triangle, said ciferglif forming a geometric shape.

2. The system of claim 1, wherein the cyphometric number scale is 0, 1, 2, 3, 4, 5, 6, 7, 8, and 9.

3. The system of claim 1, wherein the cyphometric number scale is 0, 2, 4, 6, 8, 1, 3, 5, 7, and 9.

4. The system of claim 1, wherein the cyphometric number scale is 0, 4, 8, 3, 7, 2, 6, 1, 5, and 9.

5. The system of claim 1, wherein the cyphometric number scale is 0, 8, 7, 6, 5, 4, 3, 2, 1, and 9.

6. The system of claim 1, wherein the cyphometric number scale is 0, 7, 5, 3, 1, 8, 6, 4, 2, and 9.

7. The system of claim 1, wherein the cyphometric number scale is 0, 5, 1, 6, 2, 7, 3, 8, 4, and 9.

8. The system of claim 1, wherein a plurality of triangles are formed, each triangle forms a geometric shape, and the geometric shapes are joined at a common point, line, or surface.

9. The system of claim 1, wherein a plurality of shapes are formed in the triangle.

10. The process of claim 1, wherein two shapes are formed in the triangle and the shapes are mirror images of each other.

11. The system of claim 1, wherein at least three different numbers are selected from the group consisting of 0, 1, 2, 3, 4, 5, 6, 7, 8, and 9; and lines are drawn between all the identical numbers when the numbers are 1, 2, 3, 4, 5, 6, 7, or 8 and lines are drawn between all the similar numbers when the numbers 0 or 9.

12. The system of claim 1, wherein at least three different numbers are selected from the group consisting of 0, 1, 2, 3, 4, 5, 6, 7, 8, and 9; and lines are drawn between some of the identical numbers when the numbers are 1, 2, 3, 4, 5, 6, 7, or 8 and lines are drawn between some of the similar numbers when the numbers 0 or 9.

13. A computerized cryptographic system called cyphometry, the system comprising:
   a computer processor coupled to a memory performing the following steps:
   a) providing a cyphometric number scale, said cyphometric number scale having ten digits, each digit being a single integer;
   b) establishing the cyphometric number scale horizontally with a space between each of the digits;
   c) creating a first subsequent number scale beneath the cyphometric number scale by employing space adding,
      wherein the first subsequent number scale includes a series of single digit integers on a horizontal line beneath the cyphometric number scale,
      wherein space adding generates a series of single digit integers for the first subsequent number scale,
      wherein each of the single digit integers of the first subsequent number scale are positioned beneath each space between integers of the cyphometric number scale above,
      wherein each said single digit integer of said first subsequent number scale are generated by adding the two single digit integers on either side of its respective space above and then reducing the total to a single digit integer;
   d) forming a cyphometric triangle by creating eight additional number scales, each additional number scale being positioned beneath the number scale from which is was generated, each of these additional eight number scales being created by employing space adding; and e) forming a word aura derived from said cyphometric triangle.

* * * * *